US008313152B2

(12) United States Patent
Brock et al.

(10) Patent No.: US 8,313,152 B2
(45) Date of Patent: Nov. 20, 2012

(54) RECOVERY OF BITUMEN BY HYDRAULIC EXCAVATION

(75) Inventors: Dana Brock, Sebastopol, CA (US); Andrew Squires, Calgary (CA); John David Watson, Evergreen, CO (US)

(73) Assignee: Osum Oil Sands Corp. (CA)

(*) Notice: Subject to any disclaimer, the term of this patent is extended or adjusted under 35 U.S.C. 154(b) by 1015 days.

(21) Appl. No.: 11/944,013

(22) Filed: Nov. 21, 2007

(65) Prior Publication Data

US 2008/0122286 A1    May 29, 2008

Related U.S. Application Data

(60) Provisional application No. 60/867,010, filed on Nov. 22, 2006.

(51) Int. Cl.
*E21B 43/00* (2006.01)

(52) U.S. Cl. .......................................... 299/2

(58) Field of Classification Search .......... 299/2, 17, 299/4, 11; 405/266, 267, 268, 184.2; 166/259, 166/271

See application file for complete search history.

(56) References Cited

U.S. PATENT DOCUMENTS

| 604,330 A | 5/1898 | Kibling |
| 1,520,737 A | 12/1924 | Wright |
| 1,660,187 A | 2/1928 | Ehrat |
| 1,722,679 A | 7/1929 | Ranney |
| 1,936,643 A | 10/1929 | Reed |
| 1,735,012 A | 11/1929 | Rich |
| 1,735,481 A | 11/1929 | Uren |

(Continued)

FOREIGN PATENT DOCUMENTS

CA  986146  3/1976

(Continued)

OTHER PUBLICATIONS

U.S. Appl. No. 12/237,163, Gil (Sep. 24, 2008).

(Continued)

*Primary Examiner* — Sunil Singh
(74) *Attorney, Agent, or Firm* — Sheridan Ross PC

(57) ABSTRACT

In one embodiment, a method of hydraulically mining of oil sands from a well pair drilled into an oil sands deposit is disclosed. The wells are preferably installed from a protected underground workspace in or near the producing zone. The method of hydraulic mining disclosed herein includes: means of drilling production and tailings injection wells; means of augmenting hydraulic excavation for example by inducing block caving and/or wormholing; means of isolating the underground personnel areas from formation gases and fluids; and means of backfilling the excavated volumes with tailings. In one configuration, production wells are formed and lined with a frangible material, for example, a weak concrete or an inflatable epoxy-impregnated felt tube. Hydraulic mining of the full deposit thickness using a directional water jet bit begins at the far end of the drill hole and continues back in stages toward the well-head. When each stage is complete, the water jet can be used to disintegrate sections of liner to allow mining to proceed back towards the well-head. An aspect of the present invention is that it provides for backfilling of the mined volume in stages so that subsidence of the ground is avoided. Possible advantages of the hydraulic excavation method disclosed herein are the low amount of energy and water required, the high production rates possible and the tolerance to difficult geologies, to recover bitumen from oil sands as compared to thermal recovery methods such as SAGD and HAGD.

30 Claims, 15 Drawing Sheets

U.S. PATENT DOCUMENTS

| | | | |
|---|---|---|---|
| 1,811,560 A | 6/1931 | Ranney | |
| 1,812,305 A | 6/1931 | Ranney | |
| 1,816,260 A | 7/1931 | Lee | |
| 1,852,717 A | 4/1932 | Grinnell et al. | |
| 1,884,859 A | 10/1932 | Ranney | |
| 1,910,762 A | 5/1933 | Grinnell et al. | |
| 1,935,643 A | 11/1933 | Laughlin | |
| 2,148,327 A | 2/1939 | Smith et al. | |
| 2,193,219 A | 3/1940 | Bowie et al. | |
| 2,200,665 A | 5/1940 | Bolton | |
| 2,210,582 A | 8/1940 | Grosse et al. | |
| 2,365,591 A | 12/1944 | Ranney | |
| 2,670,801 A | 3/1954 | Sherborne | |
| 2,783,986 A | 3/1957 | Nelson et al. | |
| 2,786,660 A | 3/1957 | Alleman | |
| 2,799,641 A | 7/1957 | Bell | |
| 2,857,002 A | 10/1958 | Pevere et al. | |
| 2,858,676 A * | 11/1958 | Ross | 405/229 |
| 2,888,987 A | 6/1959 | Parker | |
| 2,914,124 A | 11/1959 | Ripley, Jr. | |
| 2,989,294 A | 6/1961 | Coker | |
| 3,017,168 A | 1/1962 | Carr | |
| 3,024,013 A | 3/1962 | Rogers et al. | |
| 3,034,773 A | 5/1962 | Legatski | |
| 3,207,221 A | 9/1965 | Cochran et al. | |
| 3,227,229 A | 1/1966 | Wakefield, Jr. | |
| 3,259,186 A | 7/1966 | Dietz | |
| 3,285,335 A | 11/1966 | Reistle, Jr. | |
| 3,333,637 A | 8/1967 | Prats | |
| 3,338,306 A | 8/1967 | Cook | |
| 3,353,602 A | 11/1967 | Geertsma | |
| 3,386,508 A | 6/1968 | Bielstein | |
| 3,455,392 A | 7/1969 | Prats | |
| 3,456,730 A | 7/1969 | Lange | |
| 3,474,863 A | 10/1969 | Deans et al. | |
| 3,530,939 A | 9/1970 | Turner et al. | |
| 3,613,806 A | 10/1971 | Malott | |
| 3,620,313 A | 11/1971 | Elmore et al. | |
| 3,678,694 A | 7/1972 | Haspert | |
| 3,768,559 A | 10/1973 | Allen et al. | |
| 3,778,107 A | 12/1973 | Haspert | |
| 3,784,257 A | 1/1974 | Lauber et al. | |
| 3,838,738 A | 10/1974 | Redford et al. | |
| 3,882,941 A | 5/1975 | Pelofsky | |
| 3,884,261 A | 5/1975 | Clynch | |
| 3,888,543 A | 6/1975 | Johns | |
| 3,922,287 A | 11/1975 | Pawson et al. | |
| 3,924,895 A | 12/1975 | Leasure | |
| 3,937,025 A * | 2/1976 | Alvarez-Calderon | 405/267 |
| 3,941,423 A | 3/1976 | Garte | |
| 3,948,323 A | 4/1976 | Sperry et al. | |
| 3,954,140 A | 5/1976 | Hendrick | |
| 3,957,308 A * | 5/1976 | Lambly et al. | 299/14 |
| 3,960,408 A | 6/1976 | Johns | |
| 3,986,557 A | 10/1976 | Striegler et al. | |
| 3,992,287 A | 11/1976 | Rhys | |
| 4,046,191 A | 9/1977 | Neath | |
| 4,055,959 A | 11/1977 | Fritz | |
| 4,064,942 A | 12/1977 | Prats | |
| 4,067,616 A | 1/1978 | Smith et al. | |
| 4,072,018 A | 2/1978 | Alvarez-Calderon | |
| 4,076,311 A * | 2/1978 | Johns | 299/2 |
| 4,085,803 A | 4/1978 | Butler | |
| 4,099,388 A | 7/1978 | Husemann et al. | |
| 4,099,570 A | 7/1978 | Vandergrift | |
| 4,099,783 A | 7/1978 | Verty et al. | |
| 4,106,562 A | 8/1978 | Barnes et al. | |
| 4,116,011 A | 9/1978 | Girault | |
| 4,116,487 A | 9/1978 | Yamazaki et al. | |
| 4,152,027 A | 5/1979 | Fujimoto et al. | |
| 4,160,481 A | 7/1979 | Turk et al. | |
| 4,165,903 A | 8/1979 | Cobbs | |
| 4,167,290 A | 9/1979 | Yamazaki et al. | |
| 4,185,693 A | 1/1980 | Crumb et al. | |
| 4,203,626 A | 5/1980 | Hamburger | |
| 4,209,268 A | 6/1980 | Fujiwara et al. | |
| 4,211,433 A * | 7/1980 | Pedersen | 280/601 |
| 4,216,999 A | 8/1980 | Hanson | |
| 4,224,988 A | 9/1980 | Gibson et al. | |
| 4,227,743 A | 10/1980 | Ruzin et al. | |
| 4,236,640 A | 12/1980 | Knight | |
| 4,249,777 A | 2/1981 | Morrell et al. | |
| 4,257,650 A | 3/1981 | Allen | |
| 4,279,743 A | 7/1981 | Miller | |
| 4,285,548 A | 8/1981 | Erickson | |
| 4,289,354 A * | 9/1981 | Zakiewicz | 299/4 |
| 4,296,969 A | 10/1981 | Willman | |
| 4,406,499 A * | 9/1983 | Yildirim | 299/17 |
| 4,434,849 A | 3/1984 | Allen | |
| 4,440,449 A | 4/1984 | Sweeney | |
| 4,445,723 A | 5/1984 | McQuade | |
| 4,455,216 A | 6/1984 | Angevine et al. | |
| 4,456,305 A | 6/1984 | Yoshikawa | |
| 4,458,945 A | 7/1984 | Ayler et al. | |
| 4,458,947 A | 7/1984 | Hopley et al. | |
| 4,463,988 A | 8/1984 | Bouck et al. | |
| 4,486,050 A | 12/1984 | Snyder | |
| 4,494,799 A | 1/1985 | Snyder | |
| 4,502,733 A | 3/1985 | Grubb | |
| 4,505,516 A | 3/1985 | Shelton | |
| 4,533,182 A | 8/1985 | Richards | |
| 4,536,035 A * | 8/1985 | Huffman et al. | 299/17 |
| 4,565,224 A | 1/1986 | Keller | |
| 4,575,280 A | 3/1986 | Hemphill et al. | |
| 4,595,239 A | 6/1986 | Ayler et al. | |
| 4,601,607 A | 7/1986 | Lehmann | |
| 4,603,909 A | 8/1986 | LeJeune | |
| 4,607,888 A | 8/1986 | Trent et al. | |
| 4,607,889 A | 8/1986 | Hagimoto et al. | |
| 4,611,855 A | 9/1986 | Richards | |
| 4,699,709 A | 10/1987 | Peck | |
| 4,774,470 A | 9/1988 | Takigawa et al. | |
| 4,793,736 A | 12/1988 | Thompson et al. | |
| 4,808,030 A | 2/1989 | Takegawa | |
| 4,856,936 A | 8/1989 | Hentschel et al. | |
| 4,858,882 A | 8/1989 | Beard et al. | |
| 4,911,578 A | 3/1990 | Babendererde | |
| 4,946,579 A | 8/1990 | Ocelli | |
| 4,946,597 A | 8/1990 | Sury | |
| 4,983,077 A | 1/1991 | Sorge et al. | |
| 5,016,710 A | 5/1991 | Renard et al. | |
| 5,032,039 A | 7/1991 | Hagimoto et al. | |
| 5,051,033 A | 9/1991 | Grotenhofer | |
| 5,125,719 A | 6/1992 | Snyder | |
| 5,141,363 A | 8/1992 | Stephens | |
| 5,174,683 A | 12/1992 | Grandori | |
| 5,205,613 A | 4/1993 | Brown, Jr. | |
| 5,211,510 A | 5/1993 | Kimura et al. | |
| 5,217,076 A | 6/1993 | Masek | |
| 5,249,844 A * | 10/1993 | Gronseth | 299/17 |
| 5,255,960 A | 10/1993 | Ilomaki | |
| 5,284,403 A | 2/1994 | Ilomaki | |
| 5,316,664 A | 5/1994 | Gregoli et al. | |
| 5,330,292 A | 7/1994 | Sakanishi et al. | |
| 5,339,898 A | 8/1994 | Yu et al. | |
| 5,354,359 A | 10/1994 | Wan et al. | |
| 5,446,980 A | 9/1995 | Rocke | |
| 5,472,049 A | 12/1995 | Chaffee et al. | |
| 5,484,232 A | 1/1996 | Hayashi et al. | |
| 5,534,136 A | 7/1996 | Rosenbloom | |
| 5,534,137 A | 7/1996 | Griggs et al. | |
| 5,655,605 A | 8/1997 | Matthews | |
| 5,697,676 A | 12/1997 | Kashima et al. | |
| 5,767,680 A | 6/1998 | Torres-Verdin et al. | |
| 5,785,736 A | 7/1998 | Thomas et al. | |
| 5,831,934 A | 11/1998 | Gill et al. | |
| 5,846,027 A | 12/1998 | Fujii | |
| 5,852,262 A | 12/1998 | Gill et al. | |
| 5,879,057 A | 3/1999 | Schwoebel et al. | |
| 5,890,771 A | 4/1999 | Cass | |
| 6,003,953 A | 12/1999 | Huang et al. | |
| 6,017,095 A | 1/2000 | DiMillo | |
| 6,027,175 A | 2/2000 | Seear et al. | |
| 6,206,478 B1 | 3/2001 | Uehara et al. | |
| 6,230,814 B1 | 5/2001 | Nasr et al. | |
| 6,257,334 B1 | 7/2001 | Cyr et al. | |
| 6,263,965 B1 | 7/2001 | Schmidt et al. | |

| | | | |
|---|---|---|---|
| 6,277,286 | B1 | 8/2001 | Søntvedt et al. |
| 6,364,418 | B1 | 4/2002 | Schwoebel |
| 6,412,555 | B1 | 7/2002 | Sten-Halvorsen et al. |
| 6,510,897 | B2 | 1/2003 | Hemphill |
| 6,554,368 | B2 | 4/2003 | Drake et al. |
| 6,569,235 | B2 | 5/2003 | Carter, Jr. |
| 6,591,908 | B2 | 7/2003 | Nasr |
| 6,604,580 | B2 | 8/2003 | Zupanick et al. |
| 6,631,761 | B2 | 10/2003 | Yuan et al. |
| 6,662,872 | B2 | 12/2003 | Gutek et al. |
| 6,679,326 | B2 | 1/2004 | Zakiewicz |
| 6,705,401 | B2 | 3/2004 | Buckle et al. |
| 6,708,759 | B2 | 3/2004 | Leaute et al. |
| 6,758,289 | B2 | 7/2004 | Kelley et al. |
| 6,796,381 | B2 | 9/2004 | Ayler et al. |
| 6,857,487 | B2 | 2/2005 | Galloway et al. |
| 6,869,147 | B2 | 3/2005 | Drake et al. |
| 6,880,633 | B2 | 4/2005 | Wellington et al. |
| 6,929,330 | B2 | 8/2005 | Drake et al. |
| 6,997,256 | B2 | 2/2006 | Williams et al. |
| 7,066,254 | B2 | 6/2006 | Vinegar et al. |
| 7,097,255 | B2 | 8/2006 | Drake et al. |
| 7,128,375 | B2 | 10/2006 | Watson |
| 7,163,063 | B2 | 1/2007 | Seams |
| 7,185,707 | B1 | 3/2007 | Graham |
| 7,192,092 | B2 | 3/2007 | Watson |
| 7,240,730 | B2 | 7/2007 | Williams et al. |
| 7,419,223 | B2 * | 9/2008 | Seams ............................... 299/2 |
| 7,448,692 | B2 | 11/2008 | Drake et al. |
| 7,464,756 | B2 | 12/2008 | Gates et al. |
| 7,641,756 | B2 * | 1/2010 | Schwert ....................... 156/293 |
| 7,757,784 | B2 | 7/2010 | Fincher et al. |
| 2002/0015619 | A1 * | 2/2002 | Stephens .................. 405/129.3 |
| 2003/0160500 | A1 | 8/2003 | Drake et al. |
| 2004/0211559 | A1 | 10/2004 | Nguyen et al. |
| 2005/0051362 | A1 | 3/2005 | McGuire et al. |
| 2005/0109505 | A1 * | 5/2005 | Seams .......................... 166/263 |
| 2007/0039729 | A1 | 2/2007 | Watson |
| 2007/0044957 | A1 | 3/2007 | Watson |
| 2007/0085409 | A1 | 4/2007 | Drake et al. |
| 2008/0017416 | A1 | 1/2008 | Watson et al. |
| 2008/0078552 | A1 | 4/2008 | Donnelly et al. |
| 2008/0087422 | A1 | 4/2008 | Kobler et al. |
| 2010/0276140 | A1 | 11/2010 | Edmunds et al. |
| 2011/0120709 | A1 | 5/2011 | Nasr et al. |

FOREIGN PATENT DOCUMENTS

| | | |
|---|---|---|
| CA | 986544 | 3/1976 |
| CA | 1165712 | 4/1984 |
| CA | 1167238 | 5/1984 |
| CA | 1289057 | 9/1991 |
| CA | 2124199 | 6/1992 |
| CA | 2222668 | 5/1998 |
| CA | 2340506 | 9/2001 |
| CA | 2526854 | 9/2001 |
| CA | 2583508 | 9/2001 |
| CA | 2583513 | 9/2001 |
| CA | 2583519 | 9/2001 |
| CA | 2583523 | 9/2001 |
| CA | 2358805 | 10/2001 |
| CA | 2315596 | 2/2002 |
| CA | 2332207 | 2/2002 |
| JP | 03-267497 | 11/1991 |
| JP | 04044514 A * | 2/1992 |
| JP | 04-312697 | 11/1992 |
| WO | WO 01/69042 | 9/2001 |
| WO | WO 02/45682 | 6/2002 |

OTHER PUBLICATIONS

Author Unknown, "Kieways, The Magazine of Peter Kiewit Sons', Inc.", Jan.-Feb.-Mar. 2006, pp. 1-34.

Phan, "High-Strength Concrete at High Temperature—An Overview", National Institute of Standards and Technology, date unknown, Gaithersburg, Maryland, pp. 1-15.

Nasr, "Steam Assisted Gravity Drainage (SAGD): A New Oil Production Technology for Heavy Oil and Bitumens", CSEG Recorder, Alberta Research Council, Calgary, Canada, Mar. 2003, p. 42.

Huang, et al., "Wet Electric Heating for Starting Up SAGD/VAPEX", Alberta Research Council, Presented at the Petroleum Society's 5th Canadian International Petroleum Conference, Jun. 2004, pp. 1-12, Paper 2004-130, Petroleum Society: Canadian Institute of Mining, Metallurgy and Petroleum.

Author Uknown, "Lateral Extension for Toronto's Metro", Tunnels & Tunnelling International, Mar. 1998, pp. 46-49.

Hardy, "Feasibility Study for Underground Mining of Oil Sand", Department of Energy, Mines and Resources, Canada, Sep. 1977, pp. 1-314.

Harris, et al., "Feasibility of Underground Mining of Oil Sand", Alberta Oil Sands Information Center, 1978, pp. 1-33.

O'Rourke, et al., "AOSTRA's Underground Test Facility (UTF): Mine-Assisted Recovery Under Difficult Conditions", CIM Bulletin, Jan. 1989, pp. unknown, vol. 82., No. 921.

Kindwall, et al., "Successful Use of Oxygen Decompression in Compressed Air Caisson Work", undated, pp. 1-9.

Becker, "Chapter 48: Recent Application of Slurry—and EPB-Technique in Europe", 1999 RETC Proceedings, pp. 857-864.

Palmer, et al., "Performance of a 7.6-m Diameter Full-Face Tunnel-Boring Machine Designed for a Canadian Coal Mine", date unknown, pp. 203-208.

Wallis, "Canadian Coal Given the TBM Treatment at Cape Breton", Tunnels & Tunnelling, May 1985, pp. 1-4.

Marsh et al., "Chapter 11: Design, Excavation, Support of a Large Diameter Coal Mine Access Decline Using a Tunnel Boring Machine", 1985 RETC Proceedings, vol. 1, pp. 155-176.

Peer, "Giant Rock TMB to Drive Access Tunnels Under Ocean", Heavy Construction News, Sep. 19, 1983, pp. 1-2.

Hunter, et al. "Design, Development, and Verfication of a Lovat 7.6-metre Full-Face Tunnel-Boring Machine", CIM Coal Developments, undated, pp. 1-8.

Stokes, et al., "Cutting Head Ventilation for a Full Face Tunnel Boring Machine", Cape Breton Coal Research Laboratory, CANMET, Sydney, Canada, date unknown, pp. 305-311.

Author Unknown, "Versatile Lovat Picked for Jubilee Line", Tunnels & Tunnelling, Sep. 1994, 1 page.

Humpheys, "Jubilee Line Meets the Challenge", date unknown, pp. 1-2.

Walker, "One Year Down the Jubilee Line", World Tunnelling, Feb. 1995, pp. 1-4.

Wallis, "London's JLE Experience With Closed-Face Soft-Ground Pressurised TBMs", Tunnel, Feb. 1998, pp. 1-4.

Peer, "Rock 'n' Roll Goes Underground", Heavy Construction News, Oct. 1997, pp. 12-13.

Skelhorn et al., "North American Focus: Partnering in Toronto", World Tunnelling and Subsurface Excavation, Dec. 1998, pp. 1-4.

Garrod, et al., "Earth Pressure Balance TBM Performance—A Case Study", undated, pp. 41-50.

Author Unknown, "A New TBM Saves Critical Deadline at Cleuson-Dixence Switzerland", Tunnels & Tunnelling, date unknown, pp. 1-4.

Stephenson et al., "Mining Aspects of Hard to Access Oil Sands Deposits", Norwest Corporation, Mar. 2, 2006, pp. 1-57.

Deutsch et al., "Guide to SAGD (Steam Assisted Gravity Drainage) Reservoir Characterization Using Geostatistics", Centre for Computational Geostatistics (CCG) Guidebook Series vol. 3, 2005 (27 pages).

Author Unknown, "Technical Overview: Nigeria's Bitumen Belt and Developmental Potential", Ministry of Solid Minerals Development, Mar. 6, 2006, Available at http://64.233.167.104/search?q_cache:m12yiQ5o16EJ:msmd.gov.ng/privatisation/docs/Bitumen%2520Overview.pdf+SAGD+a..., printed Jan. 10, 2007, pp. 1-48.

Piper, et al., "An Evaluation of Heavy Oil Mining", Energy Development Consultants,, Inc. and Stone Webster Engineering Corp., Department of Energy Contract No. DE-AC03-80PC30259, Dec. 1982, pp. 1-270.

Hutchins, et al., "Mining for Petroleum: Feasibility Study", Energy Development Consultants, Inc., US Bureau of Mines Contract No. JO275002, Jul. 1978, pp. 1-365.

Author Unknown, "Future of Oil Recovery from Underground Drill Sites", Underground Technology Research Council, Committee of Mine Assisted Oil Recovery, Dec. 1988, pp. 1-51.

Fontaine, et al., "An Evaluation of Oil Mining in Ohio Phase II", Sep. 1983, pp. unknown.
Fontaine, et al., "Recommeded Reservoir Engineering Testing Program for Oil Mining Projects", Jan. 1984, pp. 1-140.
Riddell, "Oil Mining A Review of Projects", Jun. 1984, pp. 1-32.
Hutchins, et al., "Oil Mining: An Emerging Technology", Wassum Mining Engineering, Dec. 1981, pp. 1-4.
Dick, et al., "Oil Mining", U.S. Bureau of Mines, 1980, pp. 1-6.
Dobson, et al., "Mining Technology Assists Oil Recovery from Wyoming Field", Journal of Petroleum Technology, from Soc. Pet Eng., Apr. 1981, pp. 1-7.
Author Unknown, "Oil Mining: The Fourth Order of Oil Recovery", Compressed Air Magazine, Dec. 1983, pp. 6-10.
Riddell, et al., "Heavy Oil Mining Technical and Economic Analysis", Presented at California Regional Meeting of the Society of Petroleum Engineers, Long Beach, CA Apr. 11-13, 1984, pp. 1-24.
Author Unknown, Lovat Inc. Company Brochure, date unknown, pp. 1-122.
Author Unknown, "Sunburst Excavation", In Focus, Nov. 1993, pp. 18-19, 22-23.
Hignett et al.; "Tunnelling Trials in Chalk: Rock Cutting Experiments"; TRRL Laboratory Report 796; 1977.
Wallis, "Canadian coal given the TBM treatment at Cape Breton", Reprinted from Tunnels & Tunnelling, May 1985, pp. 1-4.
Ozdemir, et al., "Development of a Water Jet Assisted Drag Bit cutting Head for Coal Measure Rock" Chapter 41, RETC Proceedings, vol. 2, 1983, pp. 701-718.
Wang, et al.; "High Pressure Water Jet Assisted Tunnelling" Chapter 34, 1976 RETC Proceedings, pp. 649-676.
McCormick, et al., "Analysis of TBM Performance at the Record Setting River Mountains Tunnel #2", Chapter 8, 1997 RETC Proceedings, pp. 135-149.
Maciejewski, "Hydrotransport—An Enabling Technology for Future Oil Sands Development" Syncrude Canada Ltd., pp. 67-79.
Paine, et al., "Understanding hydrotransport: The key to Syncrude's success", CIM Bulletin, vol. 92, 1999, pp. 105-108.
Mikula et al., "Oil Sands Conditioning, Bitumen Release Mechanisms, and New Process Development", Alberta Oil Sands Information Services, 1999, pp. 1-8.
Mikula et al., "Commercial Implementation of a Dry Landscape Oil Sands Tailings Reclamation Option: Consolidated Tailings", Alberta Oil Sands Information Services; No. 1998.096, date unknown, pp. 907-921.
Friesen et al., "Monitoring of Oil Sand Slurries by On-line NIR Spectroscopy", Petroleum Society of CIM & Aostra, paper No. 94.10, date unknown, pp. 1-9.
Liu, et al.; "Volume reduction of oil sands fine tails utilizing nonsegregating tailings", Tailings and Mine Waste '96, pp. 73-81.
Matthews, et al., "Development of composite tailings technology at Syncrude Canada", Syncrude EDM Research, 2000, pp. 455-463.
Yoshidawa, et al., "A Study of Shield Tunnelling Machine (Part 1)—Soil Condition for Pressurized Slurry Shield to be Adapted-", Translation Copy of Hitachi Zosen Technical Review, vol. 42, No. 1-4, 1981, pp. 1-41.
Author Unknown, "Mitsubishi Shield Machine", Mitsubishi Heavy Industries, Ltd., date unknown, pp. 1-38.
Czarnecki, Press Release; NSERC Industrial Research Chair in Oil Sands Syncrude Canada, Ltd, date unknown, pp. 1-3.
Canadian Heavy Oil Associate (CHOA) Annual Conference, Dec. 6, 2000, presentation by Oil Sands Underground Mining, Inc.
Stack, "Handbook of Mining and Tunneling Machinery", 1982, pp. 283 and 311.
Young, et al., "Full-scale Testing of the PCF Rock Excavation Method", VII Australian Tunelling Conference, Aug. 1993 pp. 259-264.
Babendererde, et al., "Extruded Concrete Lining—The Future Lining Technology for Industrialized Tunnelling," 2001 RETC Proceedings, Chapter 55, pp. 679-685.
Becker, "The Choice Between EPB- and Slurry Shields: Selection Criteria by Practical Examples," 1995 RETC Proceedings, Chapter 31, pp. 479-492.

Becker, "The Fourth Tube of the Elbe-Tunnel—Built by the World's Largest Soft Ground Tunnelling Machine", 2001 RETC Proceedings, Chapter 17, pp. 182-186.
Bergling, et al., "Main Bearings for Advanced TBMS," 1995 RETC Proceedings, Chapter 32, pp. 493-508.
Corti, et al., "Athabasca Mineable Oil Sands: The RTR/Gulf Extraction Process Theoretical Model of Bitumen Detachment," The 4.sup.th UNITAR/UNDP International Conference on Heavy Crude and Tar Sands Proceedings, vol. 5, Edmonton, AB, Aug. 7-12, 1988, pp. 41-44, 71.
Funasaki, et al., "World's Largest Slurry Shield Tunneling Report in Trans-Tokyo Bay Highway Construction," 1997 RETC Proceedings, Chapter 36, pp. 591-604.
Guetter, et al., "Two Tunnels in Totally Different Geological Formations Driven by the Same 7M Double-Shield TMB with an Extremely Thin-Walled Monoshell Honeycomb Segmental Lining System," 2001 RETC Proceedings, Chapter 21, pp. 241-260.
Herrenknecht, et al., "The New Generation of Soft Ground Tunnelling Machines," 1999 RETC Proceedings, Chapter 36, pp. 647-663.
Author Unknown, "Improving Profitability With New Technology," Joint Paper Between Petrel Robertson and Oil Sands Underground Mining, Inc., Edmonton, Alberta, Sep. 2001, pp. 1-44.
Jacobs, et al., "Hydrogen Sulfide Controls for Slurry Shield Tunneling in Gassy Ground Conditions—A Case History," 1999 RETC Proceedings, pp. 221-239.
Marcheselli, et al., "Construction of the 'Passante Ferroviario' Link in Milano, Lots 3P—5P—6P Excavation by Large Earth Pressure Balanced Shield with Chemical Foam Injection," 1995 RETC Proceedings, Chapter 36, pp. 549-572.
Moulton, et al., "Tunnel Boring Machine Concept for Converging Ground," 1995 RETC Proceedings, Chapter 33, pp. 509-523.
Author Unknown, "Underground Mining of Oil Sands," Oil Sands Underground Mining, Inc., presented at National Oil Sands Task Force, Jan. 2001 Quarterly Meeting, pp. 1-38.
Author Unknown, "A New Technology for the Recovery of Oil Sands," Oil Sands Underground Mining, Inc., presented at combined Oil Sands Task Force and Black Oil Pipeline Network Meeting, Jun. 2001, pp. 1-30.
Oil Sands Underground Mining, Inc., "A Private Sector Approach to Design/Build," presented at NAT 2002, 34 pages.
Richards, et al., "Slurry Shield Tunnels on the Cairo Metro," 1997 RETC Proceedings, Chapter 44, pp. 709-733.
Rose, "Steel-Fiber-Reinforced-Shotcrete for Tunnels: An International Update," 1999 RETC Proceedings, pp. 525-536.
Sager, "Underpassing the Westerschelde by Implementing New Technologies," 1999 RETC Proceedings, pp. 927-938.
Uchiyama, "Twin TBM with Four Cutters for Subway Station (Roppongi Station in the Tokyo Metro Line 12)," 1999 RETC Proceedings, Chapter 37, pp. 665-674.
Wu, et al., "Stress Analysis and Design of Tunnel Linings," Chapter 26, pp. 431-455.
Borm, "Integrated Seismic Imaging System for Geological Prediction Ahead in Underground Construction," 2001 RETC Proceedings, Chapter 22, pp. 263-271.
Dowden, et al., "Coping with Boulders in Soft Ground TBM Tunneling," 2001 RETC Proceedings, Chapter 78, pp. 961-977.
Doyle, et al., "Construction of Tunnels in Methane Environments," 1991 RETC Proceedings, Chapter 12, pp. 199-224.
Drake, et al., "A Promising New Concept for Underground Mining of Oil Sands," technical papers presented to Canadian Institute of Mining (CIM), Ft. McMurray, Jun. 13-15, 2001, pp. 1-16.
Drake, "An Innovative Approach for the Underground Mining of Oil Sands," presented at North American Tunneling 2002, Seattle, WA May 2002 and NARMS-TAC 202, Mining and Tunneling Innovation and Opportunity Conference, Toronto, Ontario, Jul. 2002, pp. 1-8.
Higashide, et al., "Application of DOT Tunneling Method to Construction of Multi-Service Utility Tunnel Adjacent to Important Structures," 1995 RETC Proceedings, Chapter 34, pp. 527-541.
Ounanian, et al., "Development of an Extruded Tunnel Lining System" Chapter 81, 1981 RETC Proceedings, vol. 2, pp. 1333-1351.
Stokes, et al.; "Cutting head ventilation of a full face tunnel boring machine"; Cape Breton Coal Research Laboratory, CANMET, Sydney, Canada, date unknown, pp. 305-311.

Schenk, "Recent Developments in High-Pressure Water-Jet Assisted Cutting of Rock and Coal", The Pennsylvania State University, RETC Proceedings, vol. 2, Chapter 39, 1983, pp. 663-684.

Zink, et al., "Water Jet Uses in Sandstone Excavation", RETC Proceedings, vol. 2, Chapter 40, 1983, pp. 685-700.

Souder, et al. "Water Jet Coal Cutting: The Resurgence of an Old Technology", RETC Proceedings, vol. 2, Chapter 42, 1983, pp. 719-739.

Butler, "Thermal Recovery of Oil and Bitumen", ISBN 0-9682563-0-9, 2nd Printing by GravDrain, Inc., Calgary, Alberta,1998, Parts 1-8, pp. 1-548.

Li, et al., "Prediction of Oil Production by Gravity Drainage", Stanford University, SPE 84 184, Oct. 2003, pp. 1-8.

International Search Report for International (PCT) Patent Application No. PCT/US07/28526, mailed Jul. 1, 2008.

Written Opinion for International (PCT) Patent Application No. PCT/US07/28526, mailed Jul. 1, 2008.

"Plan of Operation, Shell Frontier Oil and Gas Inc., E-ICP Test Project", Oil Shale Research and Development Project, Prepared for Bureau of Land Management, Feb. 15, 2006, pp. 1-70.

Sahni, et al., "Electromagnetic Heating Methods for Heavy Oil Reservoirs", Submitted to 2000 Society of Petroleum Engineers, SPE/AAPG Western Regional Meeting, May 1, 2000, Long Beach, CA, pp. 1-12.

International Preliminary Report on Patentability for International (PCT) Patent Application No. PCT/US07/85375,issued May 26, 2009.

International Search Report for International (PCT) Patent Application No. PCT/US07/85375, mailed Jul. 1, 2008.

Written Opinion for International (PCT) Patent Application No. PCT/US07/85375, mailed Jul. 1, 2008.

Cardwell et al., "Gravity Drainage Theory," Petroleum Transactions, AIME, vol. 179, 1949, pp. 199-211.

Dykstra, H., "The Prediction of Oil Recovery by Gravity Drainage," Journal of Petroleum Technology, May 1978, pp. 818-830.

Kewen et al., "Prediction of Production by Gravity Drainage," Stanford University, SPE 84184, Oct. 2003, p. 1-8.

Terwilliger et al. "An Experimental and Theoretical Investigation of Gravity Drainage Performance," Petroleum Transactions, AIME, vol. 146, 1951, pp. 285-296.

Singh et al., "Cost Analysis of Advanced Technologies for the Production of Heavy Oil and Bitumen in Western Canada," Alberta Research Council, 17th World Energy Council, Edmonton, Alberta, Canada, Sep. 1998, 11 pages.

* cited by examiner

RECOVERY OF BITUMEN BY HYDRAULIC EXCAVATION

CROSS REFERENCE TO RELATED APPLICATIONS

The present application claims the benefits, under 35 U.S.C. §119(e), of U.S. Provisional Application Ser. No. 60/867,010 filed Nov. 22, 2006, entitled "Recovery of Bitumen by Hydraulic Excavation" to Brock, Squires and Watson, which is incorporated herein by this reference.

Cross reference is made to U.S. patent application Ser. No. 11/737,578 filed Apr. 19, 2006 entitled "Method of Drilling from a Shaft" and U.S. patent application Ser. No. 11/441,929 filed May 25, 2006, entitled "Method for Underground Recovery of Hydrocarbons", both of which are also incorporated herein by these references.

FIELD

The present invention relates generally to a method and means of mining bitumen from oil sands by hydraulic excavation from wells, especially those installed from an underground workspace.

BACKGROUND

Oil is a nonrenewable natural resource having great importance to the industrialized world. The increased demand for and decreasing supplies of conventional oil has led to the development of alternate sources of oil such as bitumen from oil sands and to a search for more efficient methods for recovery of bitumen from oil sands. Some of the bitumen recovery methods generate significant amounts of the greenhouse gas carbon dioxide, which can add upwards of 25% to the greenhouse gas emissions from use of the fuels that are ultimately refined from these alternate source of hydrocarbons.

Current Methods of Recovering Bitumen from Oil Sands

Surface Mining

The current principal method of bitumen recovery, for example, in the Alberta oil sands is by conventional surface mining of shallow deposits using large power shovels and trucks to feed a nearby slurry conversion facility which is connected to a primary bitumen extraction facility by a long hydrotransport haulage system. To date, this is the most advanced and successful method for recovering bitumen. This method generates significantly less greenhouse gases during the recovery and bitumen extraction phases than the thermal recovery methods discussed below.

Underground Mining

Some of these bitumen deposits may be exploited by an appropriate underground mining technology. Although intensely studied in the 1970s and early 1980s, no economically viable underground mining concept has ever been developed for the oil sands. In 2001, an underground mining method was proposed based on the use of large, soft-ground tunneling machines designed to backfill most of the tailings behind the advancing machine. A description of this concept is included in U.S. Pat. No. 6,554,368 "Method And System for Mining Hydrocarbon-Containing Materials" which is incorporated herein by reference. In an embodiment of this underground mining method, bitumen may be separated inside the mining machine by any number of various extraction technologies.

Steam Assisted Gravity Drain ("SAGD")

When the oil sands deposits are too deep for economical surface mining, in-situ recovery methods may be wherein the viscosity of the bitumen in the oil sand must first be reduced so that it can flow. These bitumen mobilization techniques include steam injection, solvent flooding, gas injection, and the like. The principal method currently being implemented on a large scale is Steam Assisted Gravity Drain ("SAGD"). Typically, SAGD wells or well pairs are drilled from the earth's surface down to the bottom of the oil sand deposit and then horizontally along the bottom of the deposit and then used to inject steam and collect mobilized bitumen.

The SAGD process was first reduced to practice at the Underground Test Facility ("UTF") in Alberta, Canada. This facility involved the construction of an access shaft through the overburden and oil sands into the underlying limestone. From this shaft, self-supported underground workings were developed in the underlying limestone from which horizontal well pairs were drilled up and then horizontally into the oil sands formation. The UTF is an example of "mining for access", a technique that is described below for recovery of stranded oil. With the advent of horizontal drilling techniques, it became possible to install SAGD well pairs by drilling from the surface and this is now the commonly used method of implementing the SAGD process.

The SAGD method has been applied to heavy oil and bitumen recovery with varying degrees of success, both in terms of total recovery factor and economics. A SAGD operation may be characterized by its Steam-Oil-Ratio ("SOR") which is a measure of how much steam is used to recover a barrel of heavy oil or bitumen (the SOR is determined by the number of barrels of water required to produce the steam to the number of barrels of oil or bitumen recovered). Thus, an SOR of 3 means that 3 barrels of water are required to be injected as high temperature steam to recover 1 barrel of oil or bitumen). This ratio is often determined by geological factors within the reservoir and therefore may be beyond the control of the operator. Examples of these geological factors are clay, mudstone or shale lenses that impede the migration of steam upwards and the flow of mobilized oil downwards; or thief zones comprised of formation waters. An acceptable SOR may be in the range of 2 to 3 whereas an uneconomical SOR is commonly 3 or higher. A SAGD operation with an average SOR of 3 requires energy to produce steam equivalent to about 25% to 35% of a barrel of bitumen in order to produce the next barrel of bitumen. If the energy to produce the steam is generated by fossil fuels, then, unless the resulting carbon dioxide emissions are captured and sequestered, this energy becomes an additional, substantial source of greenhouse gas emissions added to those eventually released by combusting of the fuels refined from this source bitumen or heavy oil. However, because steam can be produced by electrically-powered boilers or burners, this power could originate from non-fossil sources such as, for example, hydro, nuclear or geothermal.

Heat Assisted Gravity Drain ("HAGD")

U.S. Pat. No. 7,066,254 entitled "In-Situ Thermal Processing of a Tar Sands Formation" describes methods for heating oil sands and shales with heating elements to mobilize the heavy fractions and, at higher temperatures, in-situ refine heavy fractions to producible and usable product. Other technologies to heat heavy oil deposits and mobilize the oil for production include the use of electrodes and heating elements. Pilot phase projects currently underway include (1) heating of oil sands by electrodes and (2) direct heating of oil sands by electrically-powered heating elements. One electrode pilot in the Athabasca oil sands utilizes an array of vertically placed cathodes, anodes and recovery wells. A voltage difference is applied across anodes and cathodes, causing electrical flow through the brackish, connate, interstitial water that typically adheres to each oil sand grain. The electrical flow generates heat within the formation which lowers the viscosity of the heavy oil so that it will flow to the vertical recovery well. Examples of this approach are described in "Electromagnetic Heating Methods for Heavy Oil Reservoirs" and other documents which are presented as prior art references herein. If the energy required to heat the formation by electrodes or heating elements is originally generated by fossil fuels, then, unless the resulting carbon dioxide emissions are captured and sequestered, this energy becomes an additional, substantial source of greenhouse gas emissions added to those eventually released by combusting of the fuels refined from this source bitumen. However, because the electrodes or heating elements can be powered electrically, this power could originate from non-fossil sources such as, for example, hydro, nuclear or geothermal.

Previous Methods Proposed for Underground Mining

Surface Extractive Mining

Surface extractive mining is currently being implemented on a large scale in Alberta's Athabasca oil sands as discussed above. This method is generally applicable to oil deposits that are within a few tens of meters of the surface.

Underground Extractive Mining

Several methods of underground mining have been investigated especially in the past when oil prices have risen rapidly. For example, a number of studies were conducted in the 1980s for direct extraction of bitumen in oil sands and for direct mining of stranded light and heavy oil deposits in the US. These efforts were discontinued when oil prices subsequently fell. The economics of these methods were not competitive with conventional exploration and surface drilling at lower oil prices, and there were thought to be potential difficulties with safety and environmental issues using the underground technology available at the time.

Mining for Access

The 1980s studies referred to above also described methods of "mining for access" to oil deposits. For example, a method was described wherein shafts were sunk and tunnels driven from the shafts to the rock beneath an oil deposit. Rooms were then excavated on either side of the tunnels in the rock underlying the reservoir. These rooms were used for drilling rigs that could drill up into the oil deposit. The wells would collect oil driven by a combination of gravity, gas or water drive. The mining for access approach was considered the most promising technique for economically recovering oil using underground mining methods.

Another technology proposed for recovery of hydrocarbons, including heavy oil and bitumen, is based on mining for access. For example, a system of underground lined shafts and lined tunnels has been proposed to allow wells to be installed from under or from within a reservoir. This approach overcomes a number of problems such as surface access, product lifting difficulties and reliability of downhole pumps. In these mining for access technologies, the wellhead and its associated equipment is readily accessible and is typically only a few meters from the formation. Also, the wells are installed from the underground workspace either horizontally or inclined upwards. A discussion of these mining for access methods can be found in U.S. patent application Ser. No. 11/441,929 entitled "Method for Underground Recovery of Hydrocarbons" and U.S. patent application Ser. No. 11/737,578 entitled "Method of Drilling from a Shaft", both of which are incorporated herein by reference.

Installing wells from an underground workspace, rather than drilling the wells from the surface, opens up possibilities for improving the economics of SAGD by reducing the cost of installing wells, minimizing steam transmission losses and enabling more accurate placement of well pairs. This approach also allows deposits that have surface restrictions to be exploited.

Hydraulic Mining

Hydraulic Surface Mining

Hydraulic mining has been used on a large scale for efficiently mining loose sediments. A prime example is the use of hydraulic mining for gold in California in the mid-1800s. In the proper circumstances, hydraulic mining can be very energy efficient and capable of high production rates of slurried ore. In the case of the early California mining, the environmental consequences were drastic because the mining, although efficient, was open-circuit. This allowed the ore and water to wash down streams to the valleys below.

The application of underground hydraulic mining methods for the recovery of oil from unconsolidated sands has been the subject of numerous patent specifications, one of which by Laughlin is U.S. Pat. No. 1,935,643 issued Nov. 21, 1933. The Laughlin process involves the driving of tunnels beneath the deposit, and the application of hot water through fixed pipes projecting upwardly into the deposit, the pipes being spaced at intervals along the tunnel. The objective being to fluidize the oil sand which will then pass downwardly through outlet pipes into the tunnels for ultimate removal to a separation plant. This process, while theoretically viable, is not considered cost effective. A second, more serious problem is the danger of flooding or burial. In hydraulic mining such as described in U.S. Pat. No. 1,935,643, one of the hazards to operating personnel is that the excavation can runaway by causing massive block caving that cannot be stopped.

Hydraulic Mining of Oil Sands

Hydraulic mining techniques have been successfully demonstrated in the Alberta oil sands. Proposals have been put forward which involve mining the oil sand by hydraulic means through wells sunk from the surface. Since oil sand is uncemented, hydraulic mining appears feasible. It is known that addition of water to oil sands on horizontal surfaces turns it into a soft mass which will probably be easily collected and transported as a slurry. Hydraulic mining has been tested in shallow underground caverns in oil sands with great success in at least removing oil sands ore at high production rates. Such efforts are described, for example, in "Feasibility of Underground Mining of Oil Sand", Harris and Sobkowicz, 1978 and "Feasibility Study for Underground Mining of Oil Sand", Hardy, 1977.

Johns in U.S. Pat. No. 4,076,311 issued Feb. 28, 1978 entitled "Hydraulic Mining from Tunnel by Reciprocated Pipes" discloses a method of hydraulic underground mining of oil sands and other friable mineral deposits. Johns uses mining for access to install a tunnel complex at or near the base of the deposit, in which tunnels are driven parallel one with the other, and spaced approximately 600 meters apart. Johns uses hydraulic excavators driven outwardly from the sides of the tunnels until the excavator heads are in a position substantially midway between adjacent tunnels. The excavators are arranged in a multiple array at spaced intervals along the tunnels, these intervals being adjusted such that there is interaction during operation, between adjacent excavator heads. By systematic and programmed reciprocating movement of the individual excavators over a progressively enlarging "active zone", interacting between excavators is increased to three dimensions, horizontal, vertical, and lateral, thus effectively extending the "active zone" and increasing the volume of material being excavated. The ejector head, in addition to being provided with a multiplicity of nozzles through which fluid may be ejected at high pressure, also includes an intake or suction nozzle through which the fluidized sand, or slurry may be removed from the "active zone".

Johns does not take into account the presence of gases dissolved in the bitumen. These gases are released upon exposing the oil sands to lower than in-situ pressures and represent a significant safety hazard to underground mining and to the stability of Johns tunneling methods. It is possible that in deeper deposits that the exolution of gas from the bitumen can dislodge material in an uncontrolled manner and collapse the tunnel. In addition, Johns does not backfill his mined volume and therefore allows for significant and uncontrolled ground subsidence which would be unacceptable in view of current oil sands recovery regulations, especially if there are surface restrictions (such as wildlife habitats, towns, lakes etc) above the deposit to be mined.

There remains, therefore, a need for a method and means to recover bitumen from oil sands that cannot be recovered by surface mining; that is substantially more energy efficient than SAGD or HAGD; that generates substantially less carbon dioxide emissions to the atmosphere than SAGD and HAGD; whose recovery factor is not susceptible to geology variations (such as, for example, clay and mudstone barriers and thief zones); that does not cause ground subsidence; and that can be carried out safely on a large scale.

SUMMARY

These and other needs are addressed by the present invention. The various embodiments and configurations of the present invention are directed generally to hydraulically mining of oil sands from one or more wells drilled into a deposit.

In a first embodiment, a method is provided that includes the steps:

(a) through a well, hydraulically excavating an in situ underground hydrocarbon-containing material to form a slurried hydrocarbon-containing material;

(b) removing, through a well, the slurried hydrocarbon-containing material to form an excavated underground opening; and (c) introducing, through a well, a slurried fill material into a portion of the underground opening to form a backfilled zone.

The wells are preferably installed from a protected underground workspace just above, inside or just below the producing zone. The method can also be applied using wells drilled from the surface. However, this approach may be more difficult because of lifting problems with the oil sands slurry. The method of hydraulic mining disclosed herein includes: means of drilling production and tailings injection wells; means of augmenting hydraulic excavation for example by inducing block caving and/or wormholing; means of isolating the underground personnel areas from formation gases and fluids; and means of backfilling the excavated volumes with tailings.

In one embodiment, production wells are formed by drilling an open hole that is unlined and free standing as a result of arching of the oil sand material. Hydraulic mining, using a directional water jet bit, is initiated at the far or distal end of a production well and continues back in stages toward the well-head. A backfilling step follows each step of mining and also proceeds from the far end of a backfilling well and continues back in stages toward the well-head.

In another embodiment, wells are formed by first installing a settable aggregate core then drilling a well-bore inside the settable aggregate core. This is commonly performed by the following steps:

drilling a first opening into the in situ hydrocarbon-containing material, the first opening having a first diameter;

introducing a slurried settable aggregate (e.g., concrete, cement, shotcrete, and the like) into the first opening;

permitting the settable aggregate to set into a substantially solid phase;

thereafter drilling a second opening through the solid phase aggregate, the second opening having a second diameter smaller than the first diameter, whereby the remaining solid phase aggregate acts as a (sacrificial) liner between the first and second opening; and thereafter introducing a hydraulic drill string into the second opening to excavate and/or backfill. Hydraulic mining using a directional water jet bit begins at the far or distal end of the drill hole and continues back in stages toward the well-head. When each stage is complete, the water jet can be used to disintegrate sections of liner to allow mining to proceed back towards the well-head.

In another embodiment, wells are formed by drilling an open hole that is unlined and free standing. Thereupon, a well-bore liner is formed, for example, using an inflatable epoxy-impregnated fabric tube, to support the free-standing hole. This is commonly performed by the following steps:

drilling a first opening into the in situ hydrocarbon-containing material, the first opening having a first diameter;

introducing a settable member into the first opening;

introducing a fluid into the settable member to cause the member to contact with the wall of the first opening;

permitting the settable member to set into a substantially rigid (sacrificial) liner;

thereafter introducing a hydraulic drill string into the first opening to excavate and/or backfill. Hydraulic mining using a directional water jet bit begins at the far or distal end of the drill hole and continues back in stages toward the well-head. When each stage is complete, the water jet can be used to disintegrate sections of liner to allow mining to proceed back towards the well-head.

An aspect of the present invention is that it provides for backfilling of the mined volume in stages so that subsidence of the ground is avoided. Mining and backfilling progresses in stages and includes a number different mining and backfilling sequences to ensure that the minimum of backfill material is re-mined.

The present invention also includes a number different techniques for augmenting the hydraulic mining for situations where the oil sand cannot be efficiently mined from below. Examples of these situations include very thick oil sands deposits and deposits that include one to several zones or layers of clays, shales or mudstones. If required, the excavated openings can be intentionally caved. This may be done by suitable placement of the various excavated openings, for example, using a second excavation formed from the backfilling well over a first excavation formed from the production well, and/or the use of energetic materials, such as explosives, propellants, and the like. The energetic material can be inserted, for example, into the first excavated opening through the production well. The energetic material is then initiated to cause unexcavated hydrocarbon-containing material in proximity to the excavated opening to collapse into the opening.

One common advantage of the hydraulic excavation method disclosed herein is the low amount of energy and water required to recover bitumen from oil sands. For example, the pressure required for hydraulic or water jet excavation may be generated by storing water on the surface and utilizing its pressure head for mining at depths in the range of approximately 100 to 500 meters below the surface. The oil sand slurry so mined can be removed from underground via a large pipeline and pumps and separated on the surface. The water may be reused without treatment. The sand to be re-injected into the mined volume can be formed into a tailings slurry on the surface and will have a substantial pressure head when returned as a slurry to the subsurface, mined cavity.

The process will require water for mining but after an oil sands deposit is mined out, the net water required, other than water lost due to leakages, will be to fill the pore volume of the sand tailings used to backfill the mined volume. The sand may also be returned in a water slurry that contains a binder. The process is carried out at formation temperatures (typically about 55° F.) and requires no energy to heat the formation and mobilize the bitumen. The production is comprised of a cold oil sand slurry and a portion of the bitumen may be separated as particulate matter by screens. Otherwise, the mined oil sand slurry may be treated by the same hydrotransport methods and same bitumen extraction methods as used by the large oil sands surface mining operations.

Alternately, the extraction process may be so carried out underground in which case the water for hydraulic mining and the sand slurry for backfilling will have to be pressurized by pumps.

In other configurations, the mining process utilizes robotics to remotely perform dangerous activities such as monitoring the excavated chamber and in some cases assisting with the excavation process.

The following definitions are used herein:

"A" or "an" entity refers to one or more of that entity. As such, the terms "a" (or "an"), "one or more" and "at least one" can be used interchangeably herein. It is also to be noted that the terms "comprising", "including", and "having" can be used interchangeably.

Block caving is a mining method in which the ore is allowed to collapse due to its own weight in a controlled fashion into chutes or drawpoints. As used herein, the ore is oil sand and the drawpoint is an oil sand slurry production well. Block caving is usually used to mine large orebodies that have consistent, disseminated grade throughout. The ore mass must be weakly cemented such as oil sands or contain natural fracturing in sufficient density such that it will naturally cave when undercut. The size of the caved ore fragments cannot be too large or they will be difficult to extract from the drawpoints.

A hydrocarbon is an organic compound that includes primarily, if not exclusively, of the elements hydrogen and carbon. Hydrocarbons generally fall into two classes, namely aliphatic, or straight chain, hydrocarbons, cyclic, or closed ring, hydrocarbons, and cyclic terpenes. Examples of hydrocarbon-containing materials include any form of natural gas, oil, coal, and bitumen that can be used as a fuel or upgraded into a fuel. Hydrocarbons are principally derived from petroleum, coal, tar, and plant sources.

Hydrocarbon production or extraction refers to any activity associated with extracting hydrocarbons from a well or other opening. Hydrocarbon production normally refers to any activity conducted in or on the well after the well is completed. Accordingly, hydrocarbon production or extraction includes not only primary hydrocarbon extraction but also secondary and tertiary production techniques, such as injection of gas or liquid for increasing drive pressure, mobilizing the hydrocarbon or treating by, for example chemicals or hydraulic fracturing the well bore to promote increased flow, well servicing, well logging, and other well and wellbore treatments.

A liner as defined for the present invention is any artificial layer, membrane, or other type of structure installed inside or applied to the inside of an excavation to provide at least one of ground support, isolation from ground fluids (any liquid or gas in the ground, including those at elevated pressure), and thermal protection. As used in the present invention, a liner is typically installed to line a shaft or a tunnel, either having a circular or elliptical cross-section. Liners are commonly formed by pre-cast concrete segments and less commonly by pouring or extruding concrete into a form in which the concrete can solidify and attain the desired mechanical strength.

A manned excavation refers to an excavation that is accessible directly by personnel. The manned excavation can have any orientation or set of orientations. For example, the manned excavation can be an incline, decline, shaft, tunnel, stope, and the like. A typical manned excavation has at least one dimension normal to the excavation heading that is at least about 1.5 meters.

A mobilized hydrocarbon is a hydrocarbon that has been made flowable by some means. For example, some heavy oils and bitumen may be mobilized by heating them or mixing them with a diluent to reduce their viscosities and allow them to flow under the prevailing drive pressure. Most liquid hydrocarbons may be mobilized by increasing the drive pressure on them, for example by water or gas floods, so that they can overcome interfacial and/or surface tensions and begin to flow. Bitumen particles may be mobilized by some hydraulic mining techniques using cold water.

A production well as used herein refers to a well that is drilled into a reservoir and used to recover bitumen or heavy oil. A production well may also be called a recovery well. A backfilling well as used herein refers to a well that is drilled into a reservoir and used to inject backfill material such as sand tailings from the separation of bitumen from mined oil sands. In certain situations such as thin reservoirs, a single well may be used to recover the hydrocarbon ore and, intermittently used to inject backfill material.

A seal is a device or substance used in a joint between two apparatuses where the device or substance makes the joint substantially impervious to or otherwise substantially inhibits, over a selected time period, the passage through the joint of a target material, e.g., a solid, liquid and/or gas. As used herein, a seal may reduce the in-flow of a liquid or gas over a selected period of time to an amount that can be readily controlled or is otherwise deemed acceptable. For example, a seal between sections of a tunnel may be sealed so as to (1) not allow large water in-flows but may allow water seepage which can be controlled by pumps and (2) not allow large gas in-flows but may allow small gas leakages which can be controlled by a ventilation system.

Steam flooding as used herein means using steam to drive a hydrocarbon through the producing formation to a production well.

Steam stimulation as used herein means using steam to heat a producing formation to mobilize the hydrocarbon in order to allow the steam to drive a hydrocarbon through the producing formation to a production well.

A thief zone is typically a zone in a formation encountered during drilling into which circulating fluids can be lost. In thermal recovery methods such SAGD, a thief zone can be a water zone which disrupts SAGD performance. In a SAGD reservoir, the thief zone can be in the oil sands deposit or on top of the oil sands deposit. A SAGD thief zone will typically require substantial additional energy to turn its water to steam or it can effectively quench a SAGD steam chamber.

A tunnel is a long approximately horizontal underground opening having a circular, elliptical or horseshoe-shaped cross-section that is large enough for personnel and/or vehicles. A tunnel typically connects one underground location with another.

An underground workspace as used in the present invention is any excavated opening that is effectively sealed from the formation pressure and/or fluids and has a connection to at least one entry point to the ground surface.

A well is a long underground opening commonly having a circular cross-section that is typically not large enough for personnel and/or vehicles and is commonly used to collect and transport liquids, gases or slurries from a ground formation to an accessible location and to inject liquids, gases or slurries into a ground formation from an accessible location.

A wellhead consists of the pieces of equipment mounted at the opening of the well to regulate and monitor the extraction of hydrocarbons from the underground formation. It also prevents leaking of oil or natural gas out of the well, and prevents blowouts due to high pressure formations. Formations that are under high pressure typically require wellheads that can withstand a great deal of upward pressure from the escaping gases and liquids. These wellheads must be able to withstand pressures of up to 20,000 psi (pounds per square inch). The wellhead consists of three components: the casing head, the tubing head, and the 'christmas tree'. The casing head consists of heavy fittings that provide a seal between the casing and the surface. The casing head also serves to support the entire length of casing that is run all the way down the well. This piece of equipment typically contains a gripping mechanism that ensures a tight seal between the head and the casing itself.

Wellhead control assembly as used in the present invention joins the manned sections of the underground workspace with and isolates the manned sections of the workspace from the well installed in the formation. The wellhead control assembly can perform functions including: allowing well drilling and well completion operations to be carried out under formation pressure; controlling the flow of fluids into or out of the well, including shutting off the flow; effecting a rapid shutdown of fluid flows commonly known as blow out prevention; and controlling hydrocarbon production operations.

A wormhole is a high permeability channel believed to be generated, starting from a wellbore and propagating into a weakly cemented formations such as oil sands. Wormholes are postulated to develop when pressure gradients exceed the residual cohesion of the sand formations. A hemispherical wormhole tip is postulated to propagate as long as a critical tip pressure gradient is exceeded. The main cause of wormhole enlargement is believed to be the flux of fluids through unconsolidated sand. This flux exerts a drag force strong enough to overcome the forces that hold sand grains together, and sand grains are transported along the wormholes. The development of wormholes may substantially enhance non-thermal or cold heavy oil or bitumen slurry production in unconsolidated reservoirs.

It is to be understood that a reference to oil herein is intended to include low API hydrocarbons such as bitumen (API less than ~10°) and heavy crude oils (API from ~10° to ~20°) as well as higher API hydrocarbons such as medium crude oils (API from ~20° to ~35°) and light crude oils (API higher than ~35°).

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

Prior Art Used in the Present Invention

Figure 1:
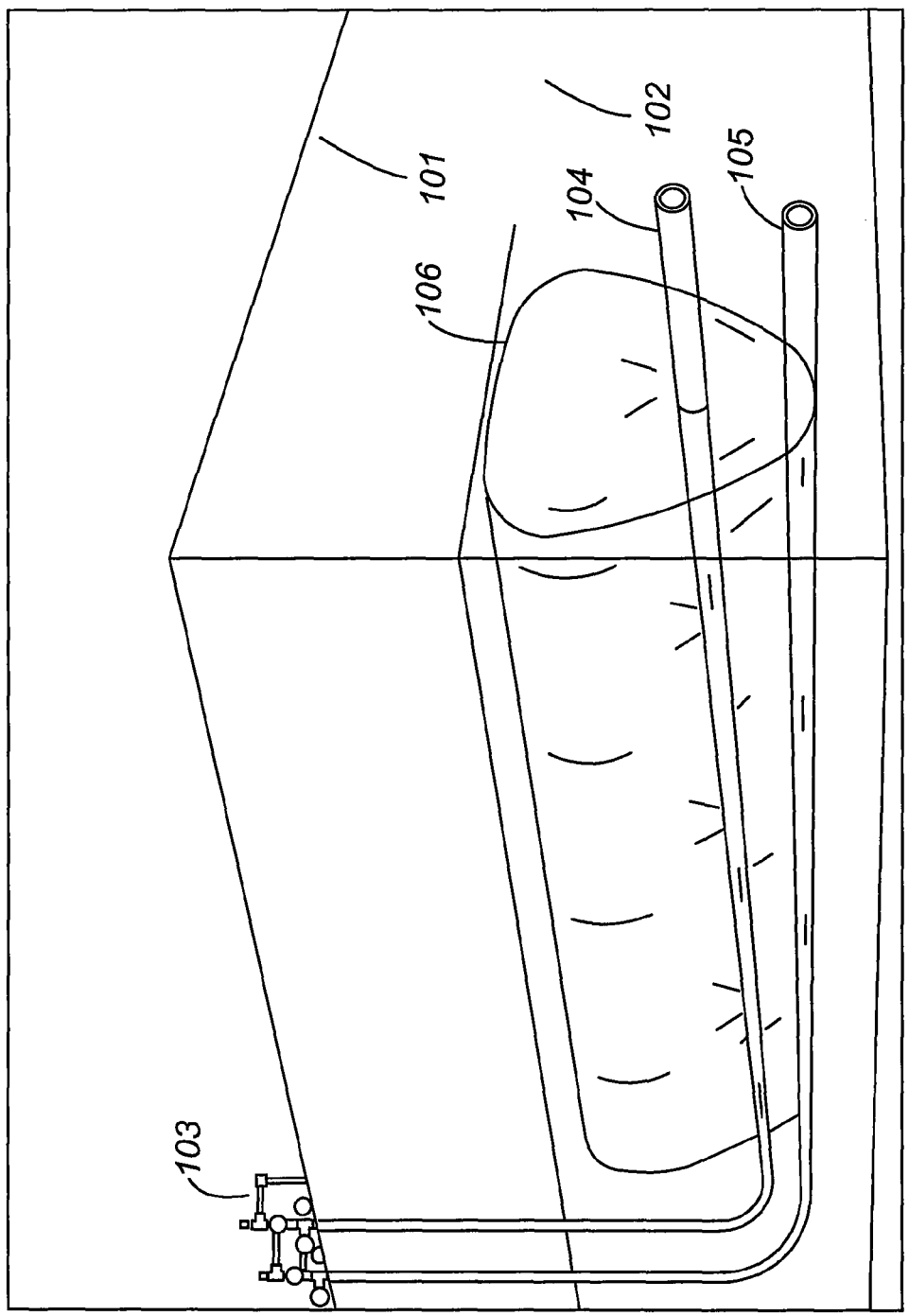
FIG. 1 is a schematic of a prior art surface-based SAGD recovery operation.

FIG. 1, which is prior art, shows a schematic representation of a well pair as installed from the surface for a SAGD operation as currently practiced. Typically, the well pair is drilled from a surface pad 103 through the overburden 101 and into an oil sand deposit 102 using directional drilling techniques. The lower well 105 is the collector or producer well and is generally located near the bottom of the oil sand deposit 102 just above the underlying bedrock. The upper well 104 is the injector well and is generally located just above the producer well 105. The injector well 104 is typically drilled to be parallel to the producer well but offset 1 to 5 meters above the producer well 104. This well pair geometry has been field tested and has confirmed the basic operation of the SAGD process. Steam is injected along the horizontal portion of injector 104 and rises into the oil sand deposit, heating the oil sand and mobilizing the bitumen in the pore space (mobilizing means reducing the viscosity to where the bitumen becomes fluid and will flow). As more bitumen is collected, the steam chamber represented by its expanding condensation front 106, grows. The steam rises and the mobilized bitumen along with condensed steam falls under gravity typically around the periphery of the condensation front 106 and is collected in the producer well 105. The placement of the well pairs horizontally not only allows the bitumen to flow downward for collection but also presents a long length of collector well to the formation so that commercially viable production rates are achieved. In practice, an oil sands deposit might be thermally produced by a number of SAGD well pairs ranging from about 5 well pairs to about 200 well pairs. The SAGD process has been successfully applied to some but not all of bitumen and heavy oil deposits.

Figure 2:
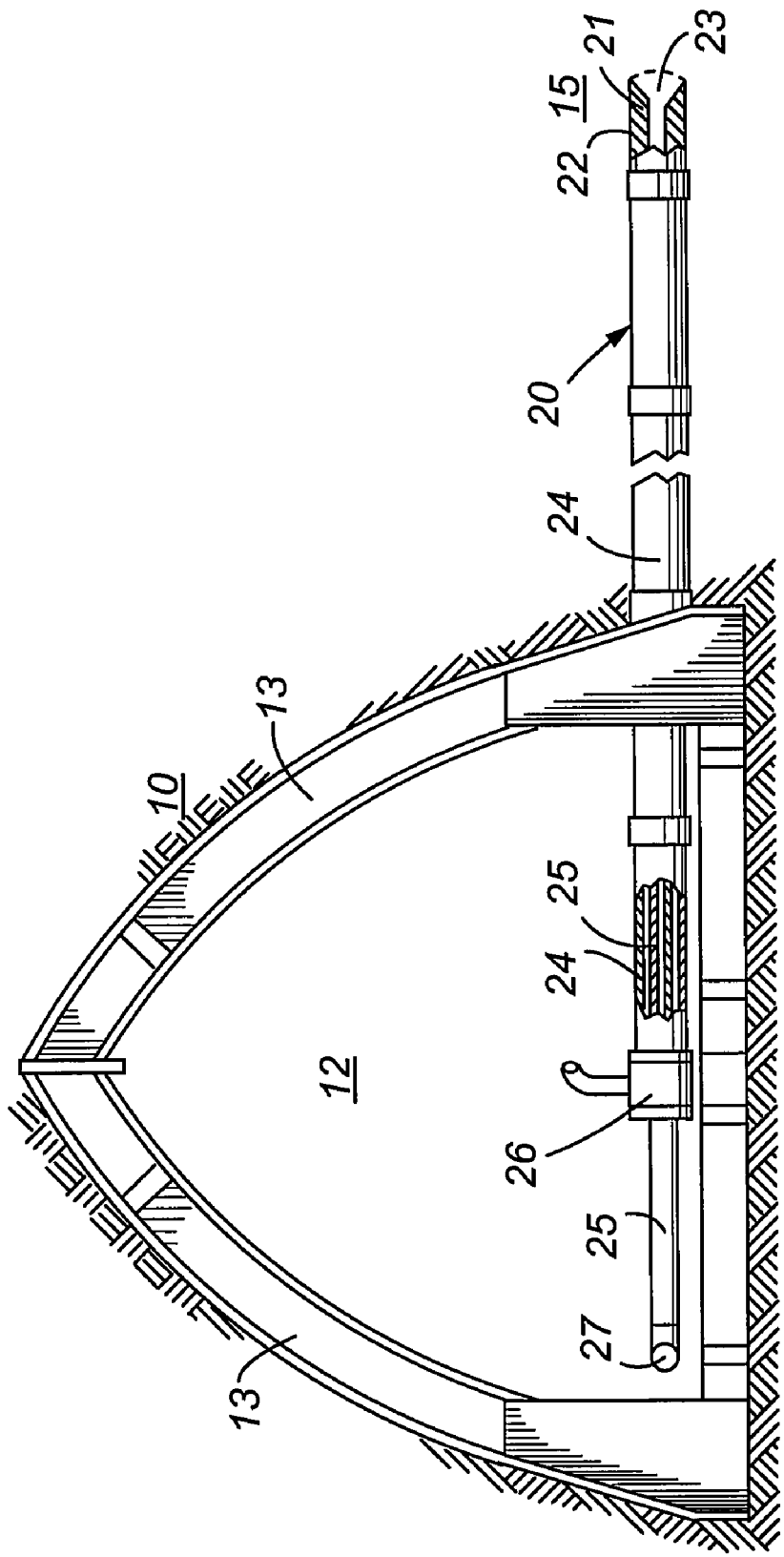
FIG. 2 is a schematic of a prior art hydraulic mining system by Johns.

FIG. 2 is a schematic of a prior art hydraulic mining system by Johns in U.S. Pat. No. 4,076,311. The mining system is being used to mine a body of sands 15 by the simultaneous operation, of a number of hydraulic excavators 20, the excavated material in the form of a slurry, being transported by conventional means, such as pumps from the operating tunnels 12 for conventional removal means to the surface. The mining operation is carried out from operating tunnels 12 positioned at or near the base of the bituminous sand deposit, the mining operation being continued by the gradual withdrawal of the excavators towards the tunnels 12, together with the reciprocation of the excavators to ultimately achieve a substantially complete removal of the entire deposit. This reciprocal movement of the excavators is accomplished in a programmed manner using conventional rod and pipe handling equipment or the like (not shown). The principal operating tunnel 12 is excavated, preferably by hydraulic means, and lined with arch sections 13. The arch sections 13 do not form part of the Johns invention. Each arch section comprises a base portion forming a flow and a cantilever portion extending upwardly from the base portion at a generally acute angle and forming a roof. The arch sections are free from any permanent interconnection. As can be seen from FIG. 2, a hydraulic excavator 20 is driven laterally into the stratographic horizon 15 within which excavation is to be initiated, horizon 15 being overlain by a presumably barren material, and also underlain by a material not requiring excavation. Preferably, operating tunnel 12 is located at or near the base of the deposit and the hydraulic excavators 20 extend laterally from the tunnel 12, however there may be particular conditions to be later described where this arrangement is changed for best utility. The hydraulic excavator 20 commonly remains within the deposit under excavation. The excavator 20 consists of an operating head 21, mounted remotely on the outer end of the excavator 20, which is formed in sections, and consists of an outer pipe 24, and an inner slurry pipe 25. The water pipe 24 is fitted with a water swivel 26, which permits the slurry pipe 25 to pass through the water pipe 24 during which operation the water pressure is sealed. The slurry pipe 25 is connected to a conventional slurry pump (not shown) through a swivel connection 27. Both the outer water pipe 24 and the inner slurry pipe 25 are made in segments, the length of each segment being sufficient to permit manipulation of these pipes within the operating tunnel. This segmentation permits the excavator 20 to be lengthened, or reduced in length by the addition or subtraction of single segments within the access tunnel 12. Conventional rod and pipe handling, not shown, is used to remove or add segments, and is controlled from an operators platform (not shown), which may be suspended from a monorail in the upper space of tunnel 12.

U.S. patent application Ser. No. 11/441,929 filed May 25, 2006, entitled "Method for Underground Recovery of Hydrocarbons" illustrates the technology of installing lined tunnels in or below an oil sands formation and drilling wells from the tunnel into the oil sands for various purposes (injecting steam or diluent to mobilize the bitumen; producing mobilized bitumen; sequestering excess water; injecting water or gas for water or gas floods etc). FIG. 1, which is also prior art, illustrates the drilling of SAGD well pairs which were first demonstrated from an underground workspace but are now predominantly installed from the surface. FIG. 2, which is prior art, illustrates a proposed method of applying hydraulic mining from an underground tunnel using hydraulic excavators. It is well known prior art that large hoses such as used in early gold mining in California illustrate the size and pressures of water streams necessary to hydraulically excavate weakly cemented materials such as oil sands at commercial production rates and with the nozzles located at distances of up to several hundred feet from the material to be excavated.

It is the objective of some embodiments of the present invention to disclose a method whereby bitumen can be recovered from deep, gassy oil sands deposits by applying hydraulic mining methods from wells installed from tunnels in or near the oil sands deposits. The method disclosed can be applied safely in the presence of formation pressure, gases and water zones. The method also includes means to inject tailings (primarily sand in the case of oil sands) back into the mined volumes so as to prevent any large scale ground subsidence. The method disclosed herein therefore overcomes several major problems of SAGD and prior proposed methods of hydraulic mining in weakly cemented materials.

Unlike SAGD, the method of the present invention can be applied so as not to require large amounts of energy to produce the steam needed to mobilize the bitumen since it is fundamentally a cold, hydraulic mining method; not to be affected by horizontal layers of impermeable clay, shale and/ or mudstone since the hydraulic jet has the power to mine through these; not to be affected by thief zones because the water from the thief zone can be used to form an oil sand slurry; and to be capable of higher well production rates and higher resource recovery factors.

The method of the present invention disclosed herein is a substantial improvement over Johns U.S. Pat. No. 4,076,311 because it can be applied in the presence of formation pressure and gases; can excavate at substantially higher production rates; and, because it backfills the excavated volumes with sand tailings, it can not cause large displacement ground subsidence.

Figure 3:
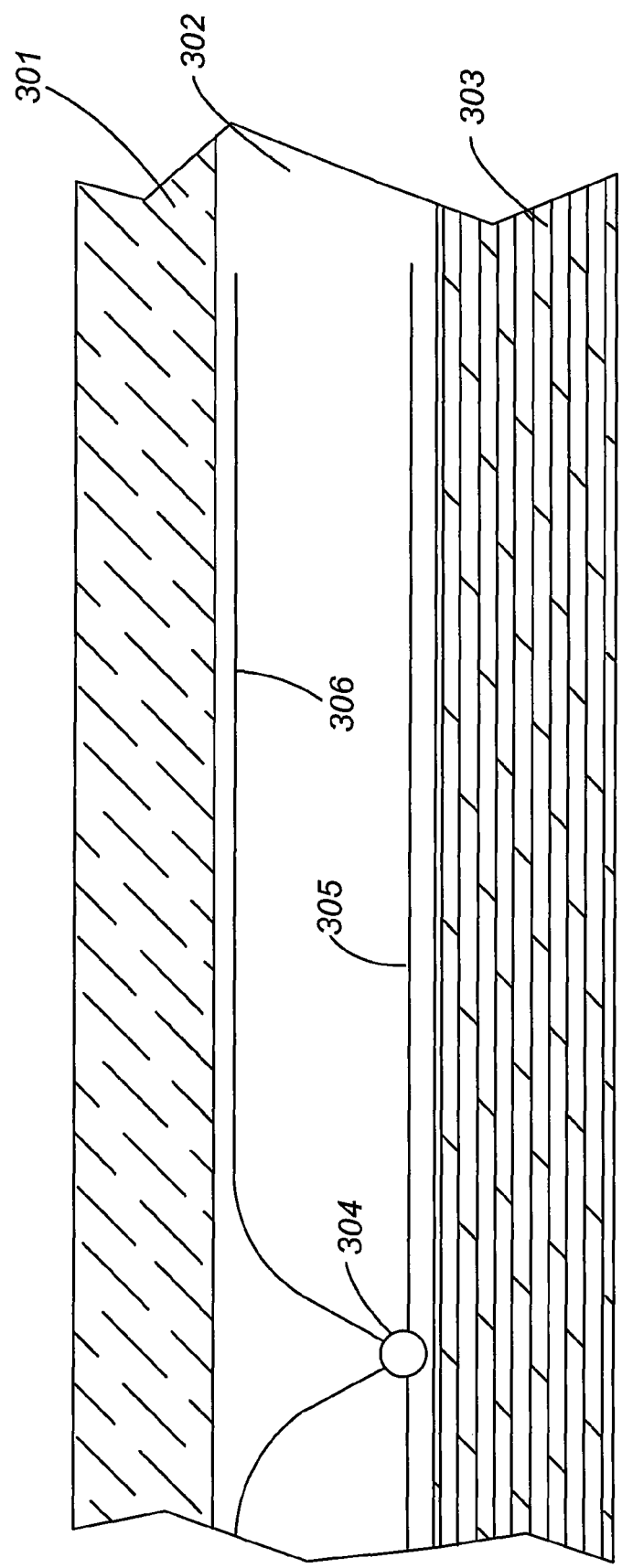
FIG. 3 is a schematic side view of a prior art well setup as applied to the present invention.

FIG. 3 is a schematic side view of the well setup of the present invention showing an end view of a lined tunnel 304 installed in an oil sands deposit 302. This figure was derived from U.S. patent application Ser. No. 11/441,929 filed May 25, 2006, entitled "Method for Underground Recovery of Hydrocarbons" and is prior art. The oil sands deposit 302 is typically overlain by an overburden layer 301 and the oil sands deposit 302 typically overlies a basement zone 303 such as for example a limestone strata. Lower wells 305 are drilled approximately horizontally out through the tunnel liner 304 for a distance in the range of about 100 to 1,200 meters. These wells are typically positioned near the bottom of the oil sands deposit 302 but the precise positioning is as critical for hydraulic mining as, for example, the placement for SAGD. Wells 305 may be used for hydraulic mining and for recovering the mined ore slurry. Wells 306 may also drilled out from the tunnel liner 304 and then upwards into the oil sands deposit 302 also for a distance in the range of about 100 to 1,200 meters out to the approximately the same distance from the tunnel 304 as the lower wells 305. These wells 306 are typically positioned near the top of the oil sands deposit 302 but the precise positioning is not critical when used for back filling. Wells 306 are used primarily for injecting tailings into the hydraulically mined volumes. Wells 306 may also be used to assist in hydraulic mining as will be described later. The tunnel 304 has a diameter in the range of about 3 meters to about 12 meters. The tunnel liner thicknesses are typically in the range of about 75 millimeters to about 600 millimeters. The well lengths are limited by the drilling technology employed but are at least in the range of about 100 to 1,200 meters. The well diameters are in the range of about 50 millimeters to about 1,500 millimeters, depending on the instructions of the reservoir engineer. The methods of drilling from within tunnel 304 may include, for example, conventional soft ground drilling methods using rotary or auger bits attached to lengths of drill pipe which are lengthened by adding additional drill pipe sections as drilling proceeds. Drilling methods may also include, for example, water jet drilling methods. Drilling methods may also include, for example, micro-tunneling techniques where a slurry excavation head is used and is advanced into the deposit by pipe-jacking methods. Directional drilling methods may be used from within tunnel 304 allowing the wells 306, for example, to be drilled upwards at an inclination and then be directionally changed to be a horizontal well at a new elevation within the formation.

Figure 4:
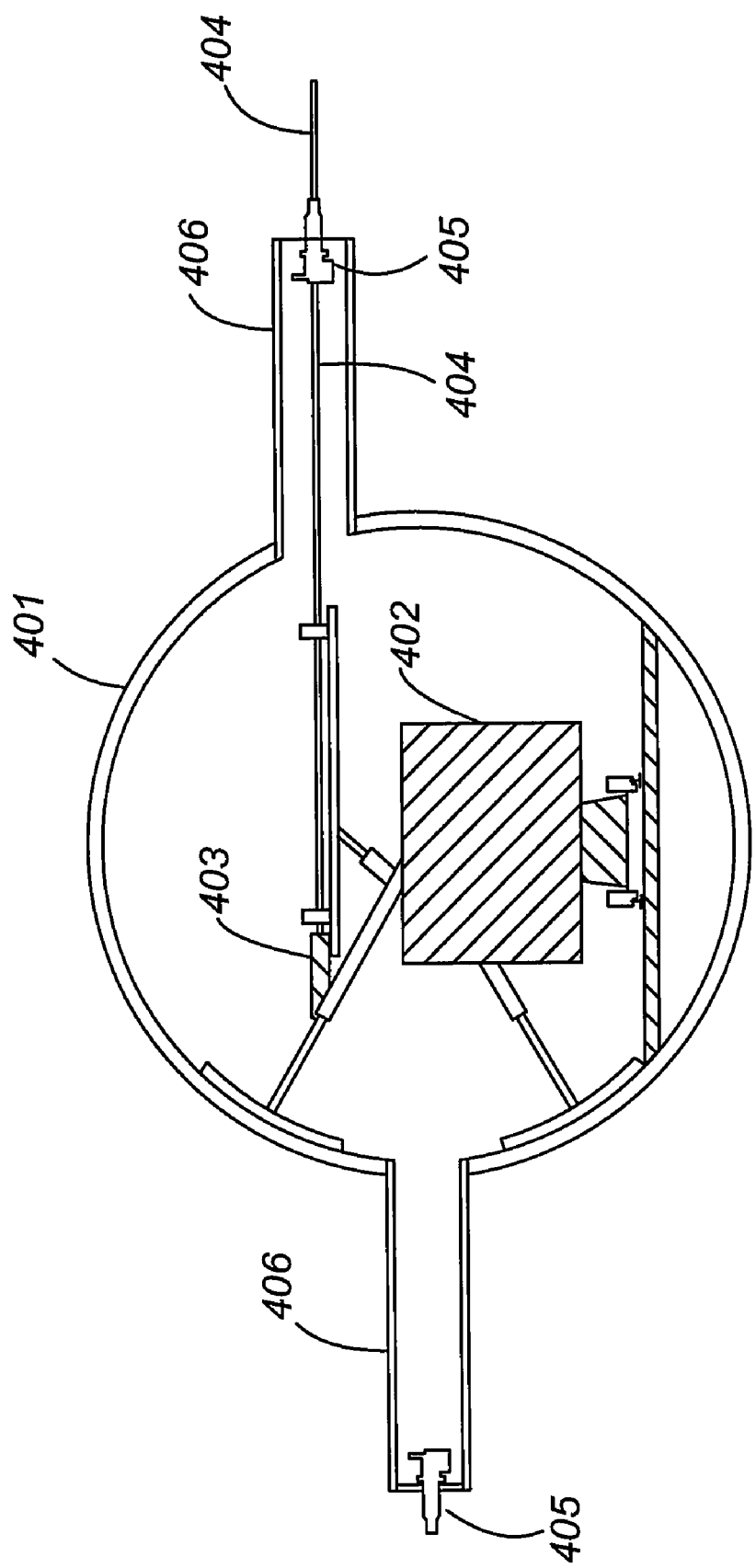
FIG. 4 is a schematic showing drilling a well into a formation from a lined tunnel which is prior art.
Figure 5A:
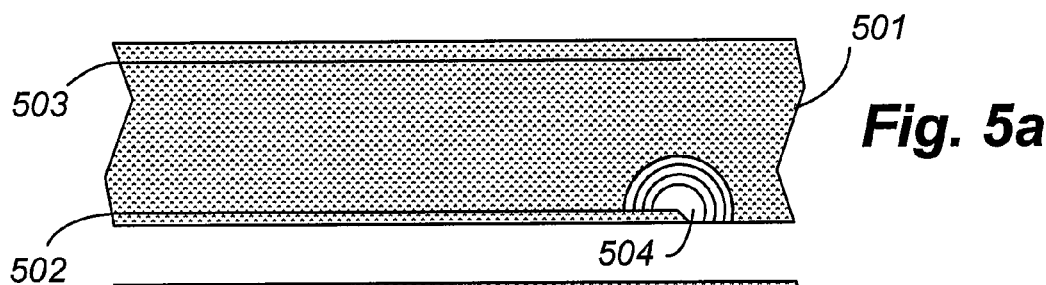
FIGS. 5a-5e show a schematic sequence of a stage of the hydraulic mining system of the present invention.
Figure 5B:
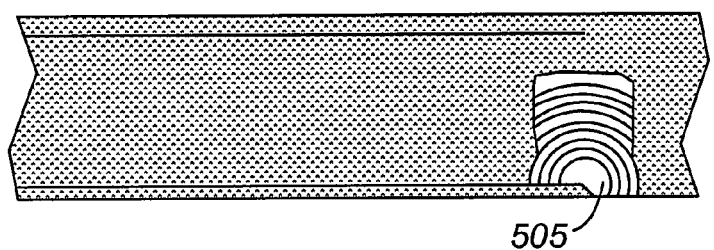
Figure 5C:
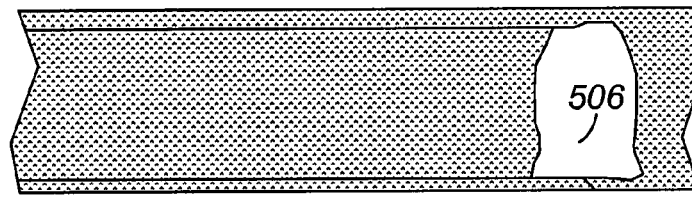
Figure 5D:
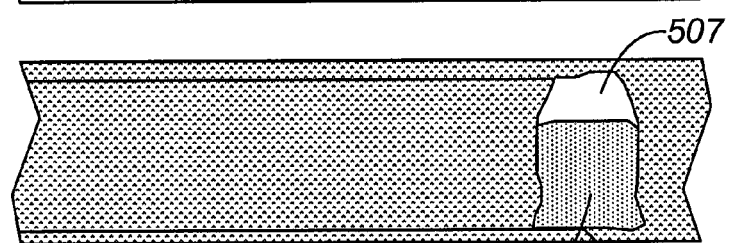
Figure 5E:
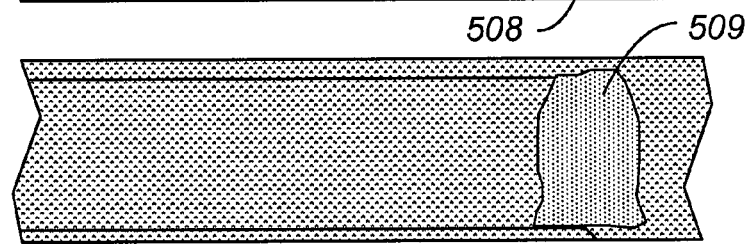
Figure 6A:
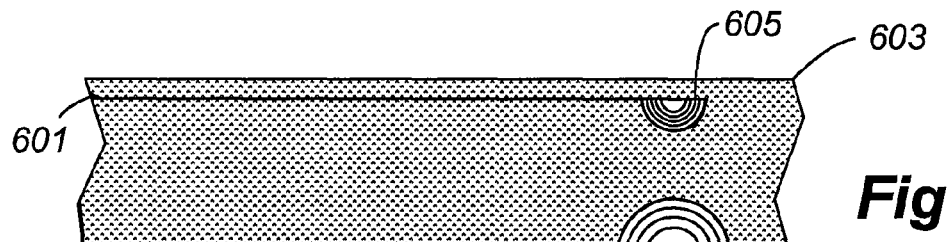
FIGS. 6a-6e show an alternate schematic sequence of a stage of the hydraulic mining system of the present invention.
Figure 6B:
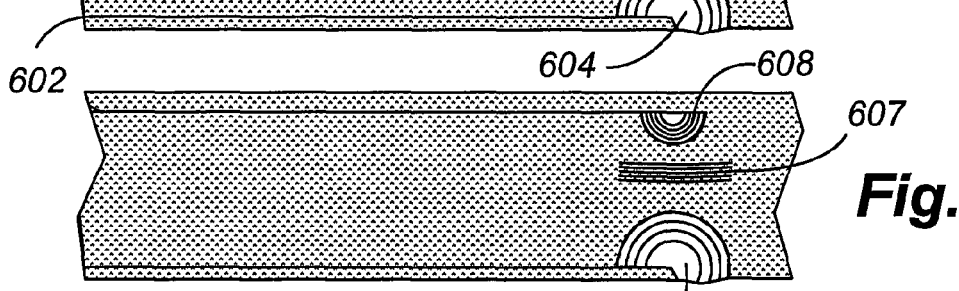
Figure 6C:
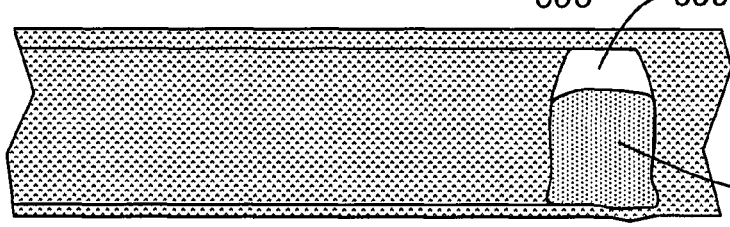
Figure 6D:
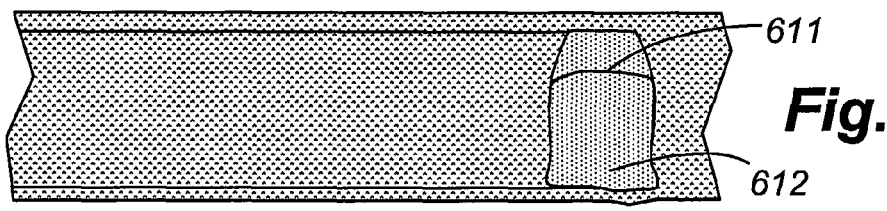
Figure 6E:
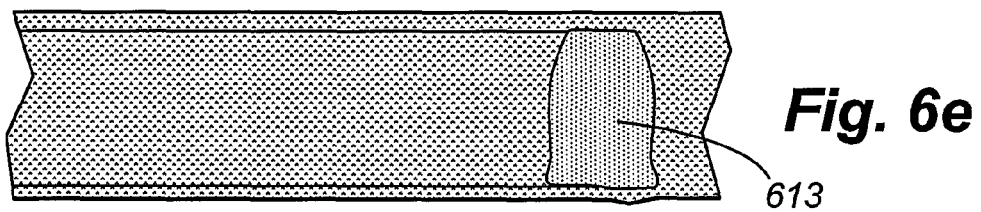
Figure 7A:
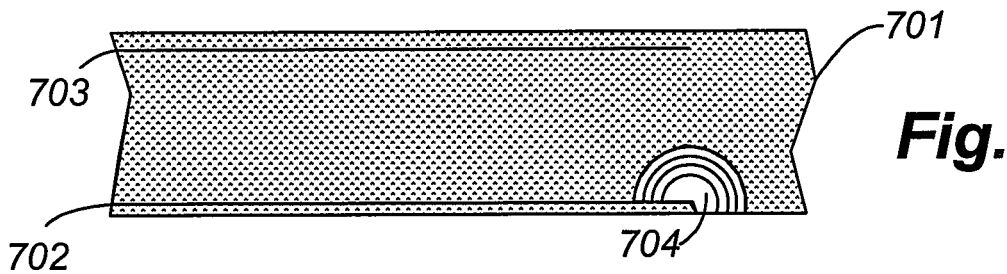
FIGS. 7a-7e show a schematic sequence of possible stages of the hydraulic mining system of the present invention.
Figure 7B:
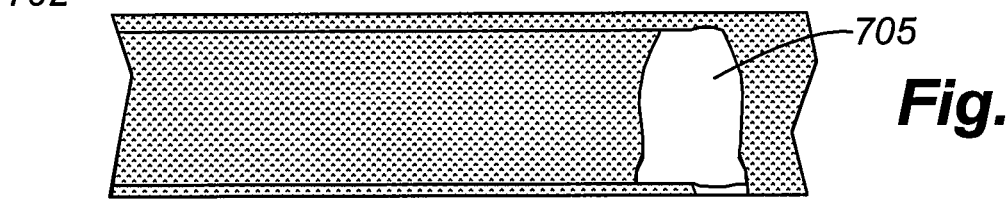
Figure 7C:
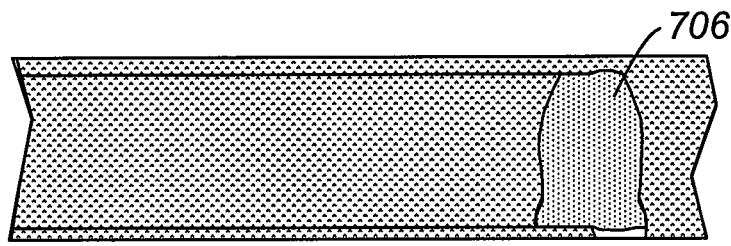
Figure 7D:
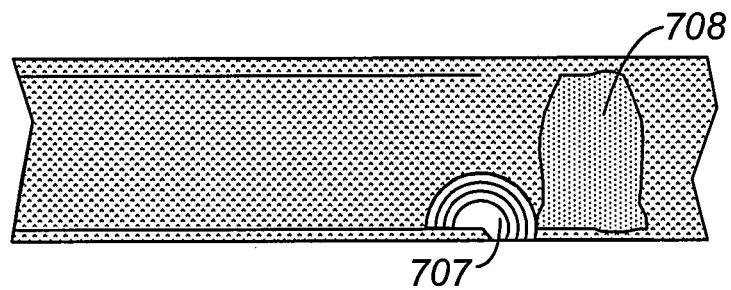
Figure 7E:
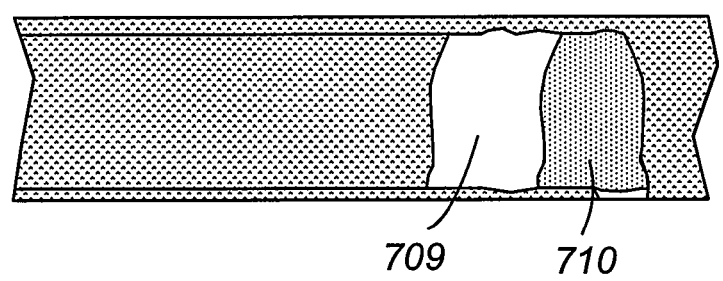

FIG. 4 is a schematic showing drilling a well into a formation from a lined tunnel which is prior art. FIG. 4 is a cutaway side view of a well-head recess 406 with well-head equipment 405 installed. Also shown is drilling equipment 402 drilling a well 404 through blow-out preventer apparatus 405 located in recess 406. Both recesses shown are located in tunnel 401. As can be seen, the well-head equipment, once installed as shown by 405, does not interfere with on-going drilling operations in other recesses. This means, for example, that not all wells need be drilled at the same time. With the recess configuration, additional recesses can be installed and additional wells can be completed while the original wells continue to be operated. This technique of installing and operating wells from a lined tunnel or shaft is described fully in U.S. Application Ser. No. 60/793,975 entitled "Method of Drilling from a Shaft", which is incorporated herein by reference. By isolating the inside of lined tunnel 401 from the formation pressure, vapors, gases and other fluids, the hydraulic mining methods of the present invention can be practiced in safety in the deeper oil sands formations which are often pressurized by formation gases such as methane and carbon dioxide and often contain mobile water aquifers.

The Hydraulic Mining Method of the Present Invention

FIG. 5 is a cross-sectional schematic sequence of one embodiment of a hydraulic mining method of the present invention. FIG. 5a shows a lower production well 502 and an upper backfilling well 503 in an oil sands deposit 501. The methods of drilling these wells may include, for example, conventional soft ground drilling methods using rotary bits, auger bits, water jets, any of which are attached to lengths of drill pipe which are lengthened by adding additional drill pipe sections as drilling proceeds; and micro-tunneling techniques where a slurry excavation head is used and is advanced into the deposit, for example, by pipe-jacking methods. Well 502 may be drilled to form a production well near the bottom of the formation 501. The diameter of well 502 is typically in the range of about ½ to 1½ meters. Arching of the oil sand matrix may keep the well 502 open. Well 502 is drilled out to a desired location in the reservoir. Cuttings wash through the production well back to access tunnel as will be described, for example, in FIG. 10. Once well 502 is completed to its full length, the hydraulic mining bit may be used to excavate an opening 504. The hydraulic mining bit may be rotatable or otherwise designed so that it can excavate an approximately hemispherical opening. As mining continues, the opening is enlarged as depicted by the contours. In FIG. 5b, the opening is shown being enlarged. Typical oil sands deposits range from about 20 meters thick to over 60 meters thick. The hydraulic mining bit may have to be changed as the mined volume 505 enlarges so that the water jet remains approximately coherent and capable of excavating from a distance. As shown in FIG. 5c, the mined volume 506 is enlarged until it reaches above the level of a sand injection well 503 which is installed near the top of the bitumen formation. The sand injection well is typically a lined well with a diameter in the range of approximately 0.15 meters to about 1 meter. In this embodiment, the hydraulic mining is stopped; the hydraulic mining bit is retracted and a sand slurry is injected into the mined void 507 as shown in FIG. 5d causing a backfilled zone 508 to be formed. Eventually, as shown in FIG. 5e, the mined void is completely filled by backfill 509. The sequence of FIG. 5 constitutes a stage of the hydraulic mining process of the present invention. The dimensions of the mined volume in a stage are dictated by the ground conditions necessary to avoid subsidence of the ground overlying the oil sands deposit.

There are several possible mining and backfilling variations that are available depending on the geology of the oil sands being mined and on the mechanical properties of the sand/water backfill. For example, the sequence shown in FIG. 5 can be operated as follows:

increase the flow rate from the hydraulic mining bit (or retract the drill string and change to a larger bit) to cut increasing into the oil sand deposit until the full thickness of formation is reached incrementally shorten or retract the hydraulic mining string, cutting the formation and fluidizing the oil sand to form a slurry so it flows back down the production well to the well-head. Incrementally shortening or retracting the hydraulic mining string may involve fragmenting, rubblizing or otherwise removing a section of the well-bore liner. Means of removing sections of liner in-situ are discussed below in FIGS. 10, 12 and 14.

when the hydraulic mining bit is retracted several tens of meters, begin pumping recycled sand down the upper well, filling the void created by hydraulically mining the oil sand, making certain that there is enough separation between the hydraulic mining bit and the recycled sand line so that substantially all of the recycled sand remains within the previously mined volume and is not mined during the next stage of excavation.

adding a binding chemical (such as for example Portland cement or fly ash) to the sand slurry to stabilize or immobilize it once it has been returned to the formation as backfill.

continue shortening or retracting the hydraulic mining bit and sand line until the well-head is reached, producing an oil sand slurry via the production well and filling the resultant mined volume with the recycled sand via the backfilling well.

A large hydraulic mining bit may be radiused, an approximately 1-meter radius sweep from horizontal to about 85 degrees upward to create an approximately 1.5-meter long (curved) nozzle. A smaller well would need to be cut with a smaller bit. Once completed, the small bit would be removed and a larger mining bit tripped in to start hydraulically mining the main volume of the oil sand deposit. Both size bits would be able to fit in the production well and allow the oil sand slurry produced to be returned in the well.

FIG. 6 is a alternate cross-sectional schematic sequence of the hydraulic mining system of the present invention. In this embodiment, the backfilling or sand injector well is used to do some hydraulic excavation in a way to assist the mining process being applied from below. FIG. 6a shows a lower well 602 and an upper well 601 in an oil sands deposit 603. Installation and sizing of wells 601 and 602 are described above in FIG. 5. As shown in FIG. 6a, a mined volume 604 is initiated at the toe of the lower well 602 and a second mined volume 605 is initiated at the toe of the upper well 601. In FIG. 6b, the lower opening 606 is enlarged while the upper opening 608 is filled with a sand slurry and, if desired, further pressurized to provide a pressure gradient that is highest at the upper portion of the oil sand deposit and tending to push the un-excavated material towards the lower mined volume 606 and tending to begin to break up the un-excavated material as depicted by zone 607. This ability is designed to assist the hydraulic mining process being applied from below. For example, such an assist may be required when the oil sand deposit is very thick or if there are layers of mudstone, shale or clay that are more difficult to mine hydraulically from below. Eventually, wormholes may form in the un-excavated material and/or the un-excavated material will collapse (block cave) into the lower volume as shown in FIG. 6c where it can be further broken up, as required, by the hydraulic bit operating from the lower well. FIGS. 6d and 6e are essentially the same as FIGS. 5d and 5e.

As shown in FIG. 5, it is possible to hydraulically mine the oil sands from the bottom well all the way up to the upper well. As shown in FIG. 6, it is possible to use the upper well to apply pressure to the un-excavated material to assist the mining operation either by block caving the un-excavated material or by causing wormholes to propagate from the lower volume towards the upper mined volume. It is also possible to retract the hydraulic bit from the lower well and insert a tool that can fire a conventional explosive charge, a shaped charge, a propellant charge, a kinetic energy projectile or the like into the roof of the lower mined volume so as to blast through or loosen the roof material so that hydraulic mining can be resumed. This can be applied for example if a hard shale or mudstone or clay layer were encountered and the hydraulic mining bit were ineffective at mining through such a layer.

FIG. 7 is a cross-sectional schematic sequence of possible stages of the hydraulic mining system illustrated in FIGS. 5 and 6. FIG. 7a shows the start of hydraulic mining of a stage. FIG. 7a shows a lower well 702 and an upper well 703 in an oil sands deposit 701. A hydraulic mining bit may be used to excavate an opening 704. In FIG. 7b, the mined volume 705 has been enlarged until it reaches above the level of a sand injection well 703 which is installed near the top of the bitumen formation. Eventually, as shown in FIG. 7c, the mined void is completely filled by backfill 706. In FIG. 7d, the liners for the lower well 702 and upper well 703 have been shortened (by one of a number of means described subsequently) and the start of hydraulic mining of a second stage has begun in the oil sands 707 adjacent to the previous backfilled zone 708. FIG. 7e shows the second mined zone 709 at completion and the previously backfilled zone 710 with some slumping. At this point, the second mined volume is backfilled by a shortened sand injection well 703. This sequence of stages is repeated until a section of reservoir is mined back to the well-head. A plan view of this sequence is shown below in FIG. 9.

It is noted that the backfill material may tend to slump as its angle of repose becomes too large. As is well-known, it is possible to forestall or avoid backfill slumping by adding any number of binding materials to the backfill slurry to stabilize the backfill mass. Binders may include, for example, small amounts of Portland cement, fly ash and the like which will tend to set up and give the backfill some strength as the water in the backfill slurry drains down and is recovered by any of the production wells.

As can be appreciated, the volume mined at each stage may vary depending on local ground conditions, formation pressure, formation gases and production capacity. Additionally, mining may be carried out more or less continuously and backfilling may be carried out while mining is in progress. Alternately, mining and backfilling may be carried out at different times and may be intermittent. For example, mining and backfilling may be stopped altogether to allow extraction of sand and bitumen from the oil sand slurry to keep pace.

Figure 8:
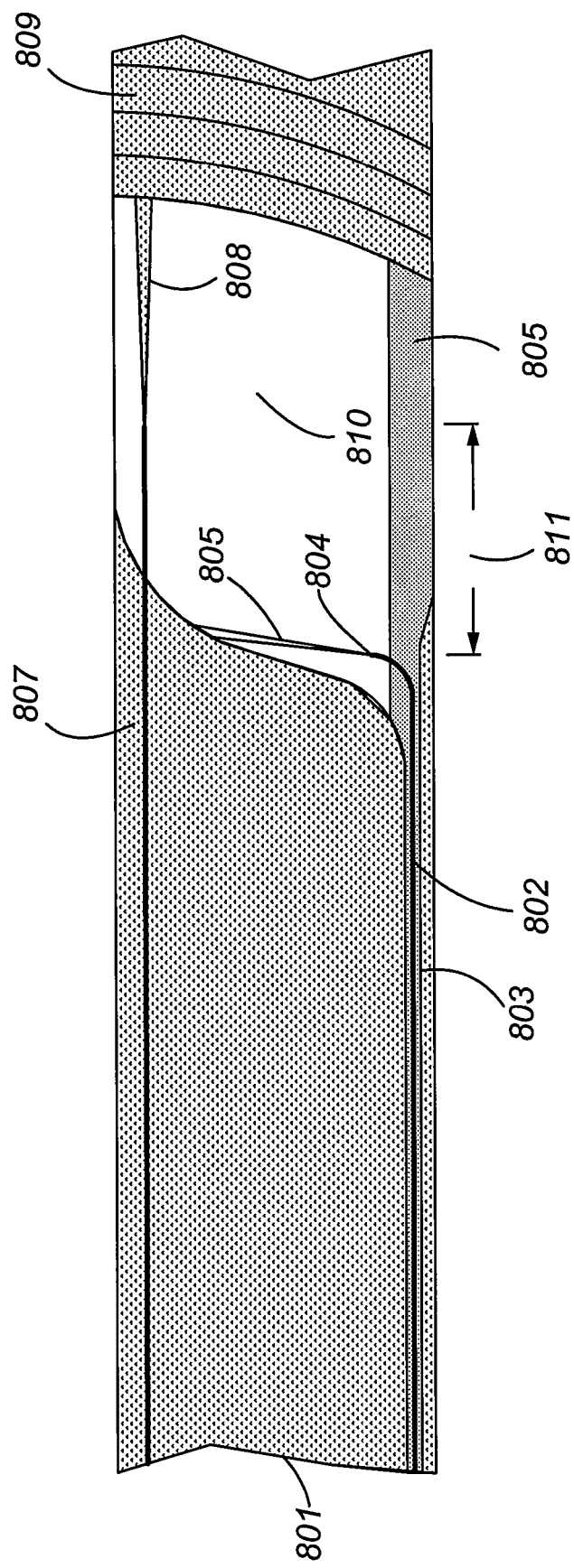
FIG. 8 is another illustration of hydraulic mining and backfill using a production well and a backfilling well.

FIG. 8 is an example of hydraulic mining and backfill from two wells where both are in operation simultaneously. A production well 803, preferably formed with a frangible liner such as described in FIGS. 12 and 14, is shown installed near the bottom of an oil sand deposit 801. A hydraulic mining drill string 802 is shown inside production well 803. A swiveling hydraulic nozzle 804 is shown directing a hydraulic stream or jet 805 at the face of the oil sand 801 being mined. As water stream 805 excavates material, it forms an oil sand slurry 806 which returns to the well-head (not shown) via production well 803. A sand slurry injection well 807 is shown near the top of the oil sand deposit 801 spraying a stream of tailings slurry 808 onto previously deposited backfill 809 (as depicted by contours over time as the backfill grows and fills mined volume 810.) The distal end of the tailings slurry injection well 807 is shown positioned behind (to the right in FIG. 8) of the production well 803 by a distance 811 which is in the range of about 10 to 30 meters, so that the mining stream 805 mines primarily oil sand 801 and not backfill material 809. As the mined face is advanced (toward the left in FIG. 8) the leading edge of the backfill also advances (toward the left in FIG. 8). The tailings slurry injection well 807 can be withdrawn by retracting it in stages towards the well-head (not shown). The production well liner 803 and the backfill well liner can be shortened as necessary by any number of means including, for example:

- retracting sections of liner by withdrawing them through the well-head. This is generally time consuming and not be practical for long wells because of liner frictional resistance.
- utilizing a casing cutter tool, such as used, for example, in the oil- and water-well drilling industries, to cut off sections of the liner which are overhanging and become to long to be self-supporting. This applicable to both the production and backfilling well liners but is most applicable to the backfilling well liner.
- utilizing a liner, which is weak enough or is equipped with breakaway joints, whose overhanging sections snap off as they become to long to be self-supporting. This applicable to both the production and backfilling well liners but is most applicable to the backfilling well liner.
- utilizing a liner made of a settable aggregate such as, for example, a lean concrete mix, which can be blasted away, rubblized or eroded away by the hydraulic jet mining tool. This is most applicable to the production well liner as the hydraulic jet which, being very close to the liner wall, would have more than enough force to blast or erode away the leading portion of the production well liner wall. This method can be utilized on the backfilling well liner, if needed.

utilizing a liner made of an inflatable liner such as, for example, a felt/epoxy-impregnated material, which can be blasted away, rubblized or eroded away by the hydraulic jet mining tool. This is most applicable to the production well liner as the hydraulic jet which, being very close to the liner wall, would have more than enough force to blast or erode away the leading portion of the production well liner wall. This method can be utilized on the backfilling well liner, if needed.

In this way, a volume of oil sand deposit can be mined from the farthest length of the production well 803 back towards the well-head (not shown) while the backfill is injected at a distance behind the mined face somewhat greater than distance 811.

Figure 9:
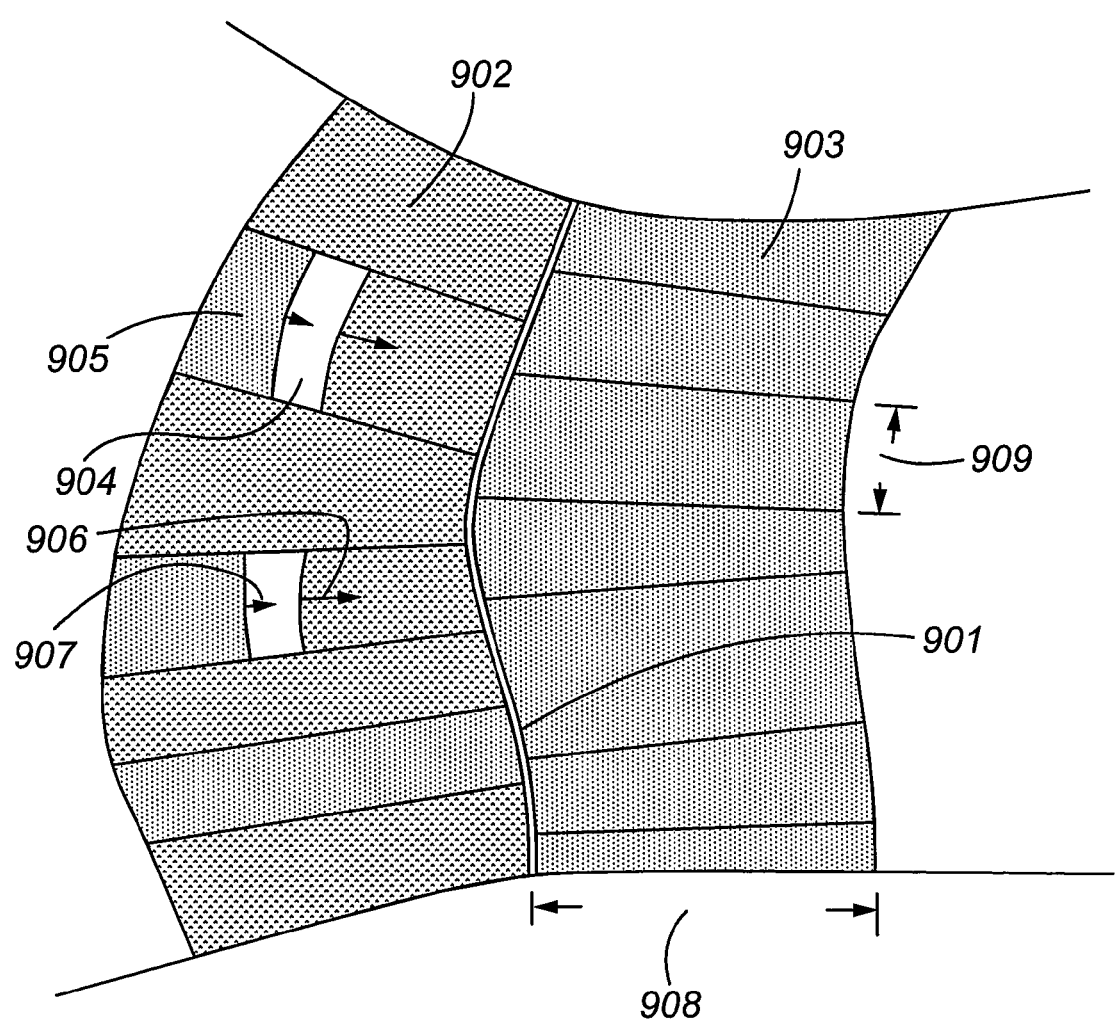
FIG. 9 shows a schematic plan view of an underground hydraulic mine of the present invention.

FIG. 9 shows a schematic plan view of an underground hydraulic mine of the present invention. A main access tunnel 901 is shown in an oil sands deposit. On one side (the right side of FIG. 9) of access tunnel 901, the oil sand material has been mined out and replaced by backfill material 903 (primarily wet sand tailings). On the other side (the left side of FIG. 9) of access tunnel 901, some sections of the oil sand material 902 have not yet been mined, one section has been mined and backfilled and two sections 905 are being actively mined and backfilled. Mined volumes 904 that have not been backfilled are also shown. In the two active mining sections, the face of the mined material is being advanced 906 towards the access tunnel 901 while the leading edge of the backfilled material is also being advanced 907 to keep pace. In this way, by maintaining a controlled span of unsupported volume, the subsidence of the roof is controlled. The length 908 of a mined section is typically in the range of about 200 to 1,500 meters depending on the size of the oil sand deposit to be mined. The width 909 of a mined section depends on the local ground conditions and vertical thickness of the oil sand deposit. The width 909 of a mined section is typically in the range of about 5 to 80 meters.

As discussed below, production rates can be quite high and it is possible to intermittently cease mining and backfilling operations and utilize robotics to diagnose and even modify a mined section. Robotic cameras or other robotic sensors (acoustic, electromagnetic, nuclear and other geophysical sensing tools) can be tripped in via either production or backfilling wells to determine, for example, the dimensions of the mined volume, the stability of the backfill, or the amount of ground subsidence, if any, above the backfill. Small robotic apparatuses can be tripped in to, for example, remove obstructions, apply binders to the backfill, break up difficult shale or mudstone layers or break off sections of liner that did not break off as intended.

Methods of Retracting the Production and Backfilling Wells

Figure 10A:
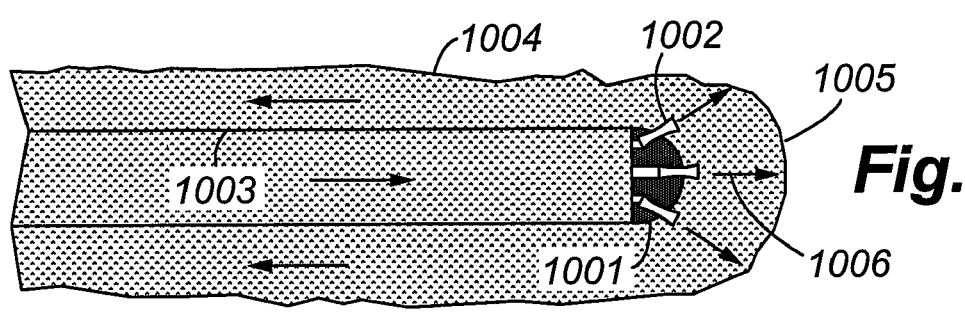
FIGS. 10a-10b are schematic drawings illustrating two methods of drilling a well.

FIG. 10 is a schematic illustrating a possible methods of drilling a production or backfilling well. As illustrated in FIG. 10*a*, a hydraulic bit or water jet bit 1001 is used to excavate an open hole 1004 where the diameter of the open hole 1004 is larger than the water jet drill and drill string pipe 1003. The centering devices for drill pipe 1003 for hole drilling are not shown. An example of a hydraulic excavating bit 1001 is shown with nozzles 1002 oriented at different angles so that they will form a larger diameter open hole 1004. The end of the open hole 1005 is advanced by the water jets by well-known soft-ground water jet drilling mechanisms. The excavated material and the water form a slurry which is returned through the annulus formed by the open hole 1004 and the conduit pipe 1003. The diameter of the open hole is in the range of about 0.2 meters to about 1½ meters. In many instances, the open hole remains open because the oil sand material arches. Since the well bore 1004 is isolated from the main access tunnel by a well-head apparatus, the hole 1004 may be pressurized to the formation pressure so that gases dissolved in the bitumen component of the oil sands do not exolve and cause the well bore 1004 to collapse. In the event that material blocks the return flow of slurry, the hydraulic jet can be shut down and the flow in the annulus formed by the open hole 1004 and the conduit pipe 1003 can be reversed to unblock the annulus. Water jet bits such as those used in the horizontal directional utility boring industry and consisting of a drilling head with a chisel-shaped reaction face and inclined jets, could also be used.

Figure 10B:
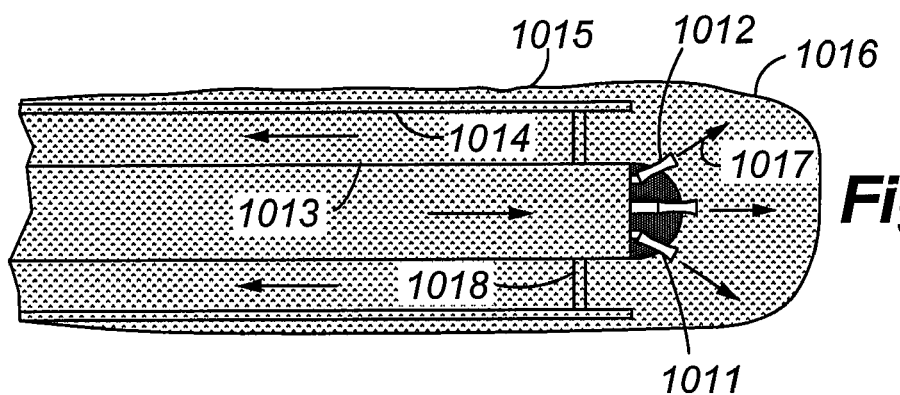
Figure 11A:
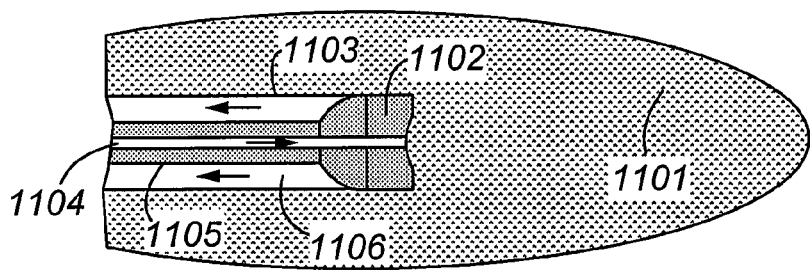
FIGS. 11a-d are schematic drawings illustrating a sequence of forming a settable aggregate core in an oil sands deposit.
Figure 11B:
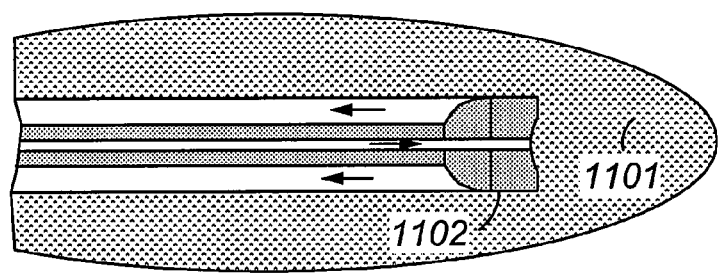
Figure 11C:
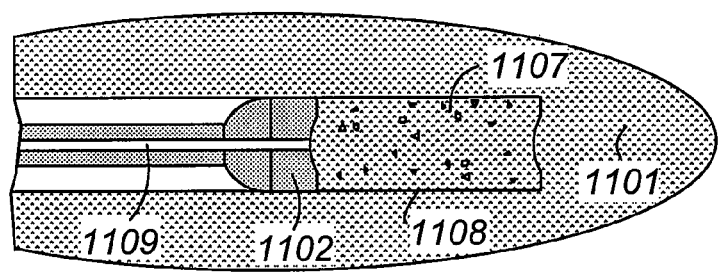
Figure 11D:
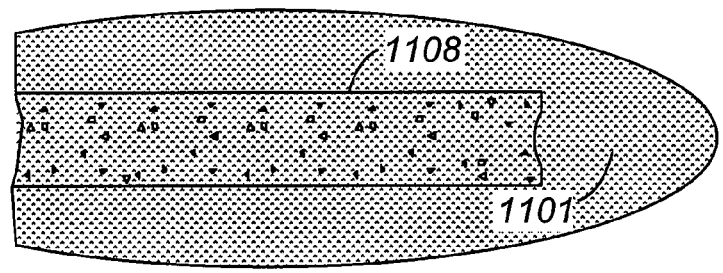
Figure 12A:
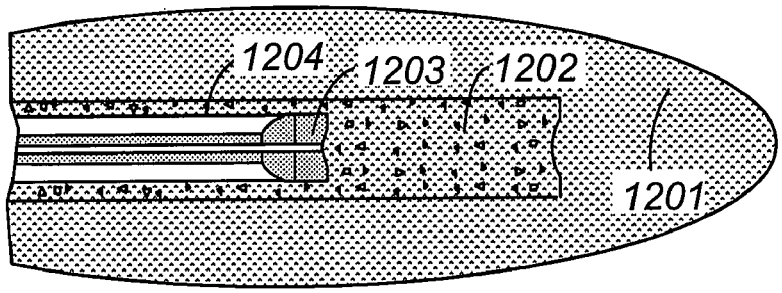
FIGS. 12a-12d show a method of drilling a well using the settable aggregate core of FIG. 11.
Figure 12B:
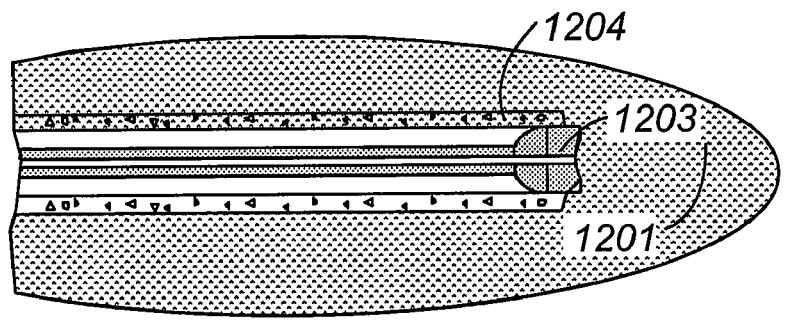
Figure 12C:
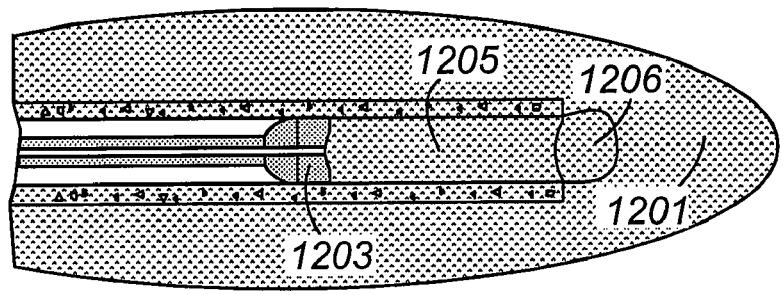
Figure 12D:
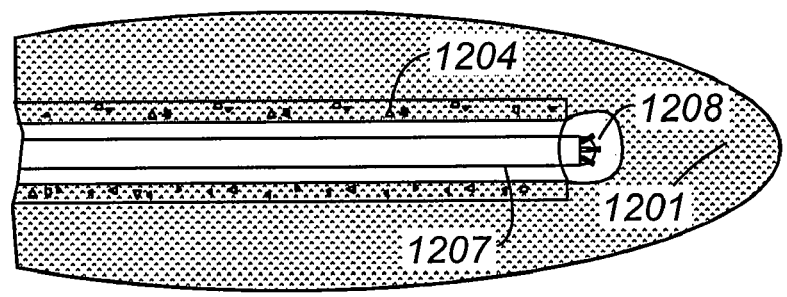
Figure 13A:
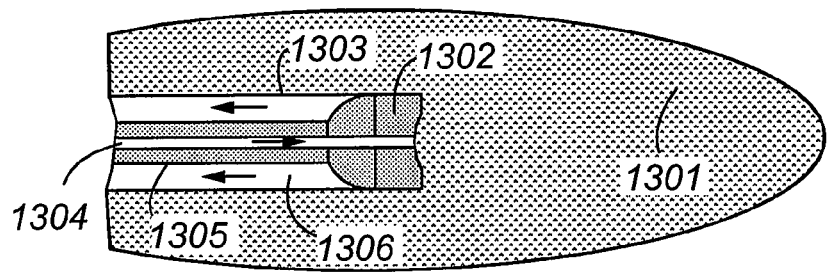
FIGS. 13a-13d are schematic drawings illustrating a sequence of forming an unsupported well in an oil sands deposit.
Figure 13B:
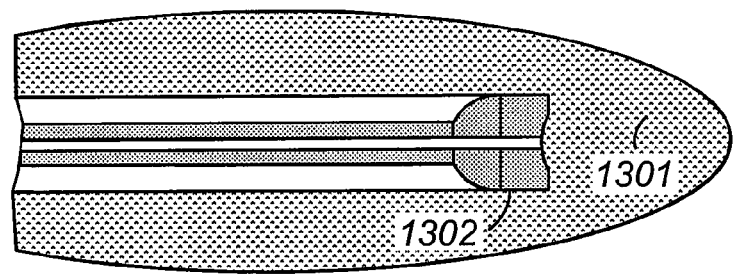
Figure 13C:
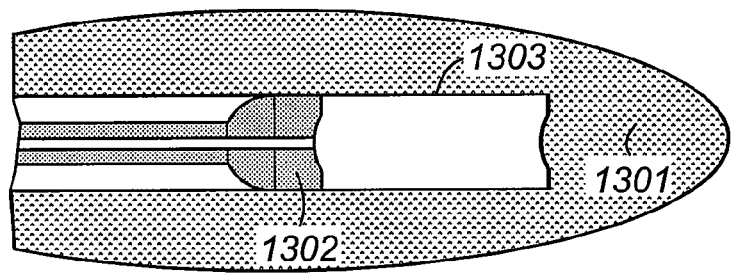
Figure 13D:
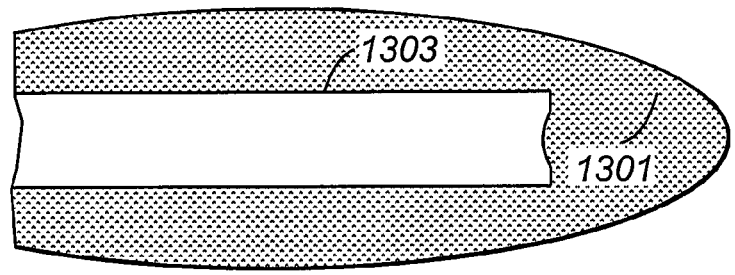
Figure 14A:
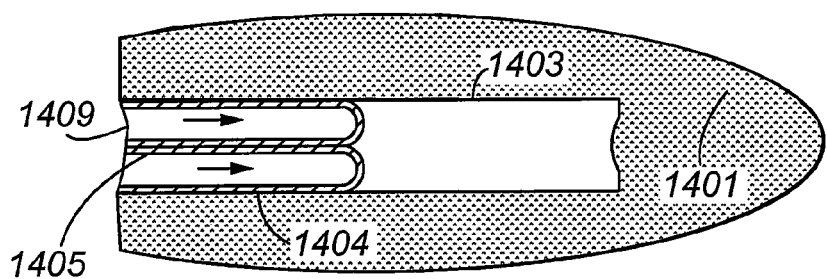
FIGS. 14a-d show a method of supporting an initially unsupported well using an inflatable liner.
Figure 14B:
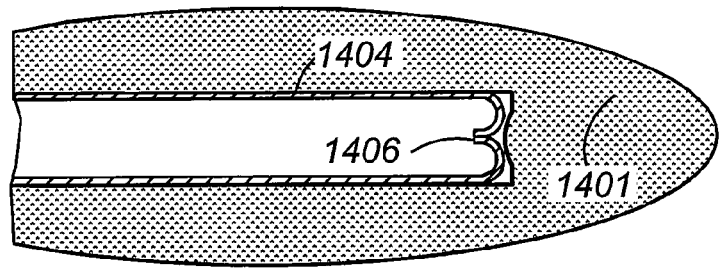
Figure 14C:
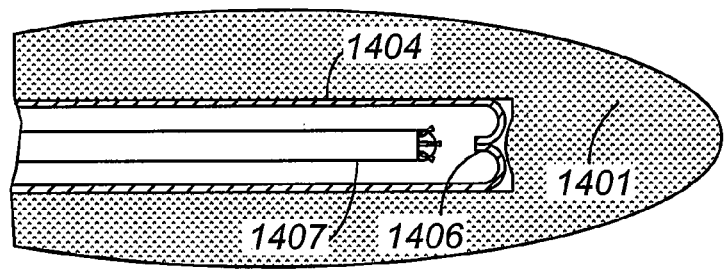
Figure 14D:
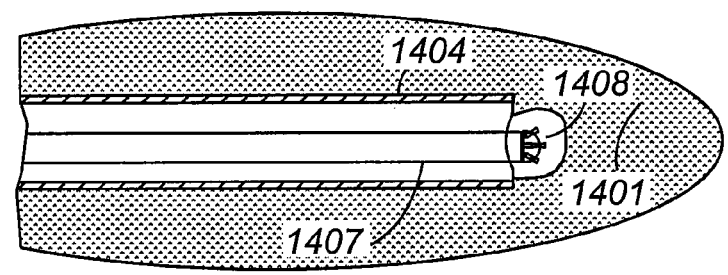

FIG. 10*b* illustrates an alternate method of drilling a production or backfilling well. In this configuration, a hydraulic bit or water jet bit 1011 is used to excavate an open hole 1015 ahead of a casing 1014 which is installed in the hole by, for example, pipe-jacking. The diameter of the casing 1014 is larger than the water jet conduit pipe 1013. The hydraulic bit 1011 is shown centered in the casing 1014 by a centering device represented by 1018, although precise centering is not a requirement. The diameter of the open hole 1015 is slightly larger than the casing 1014 to make it easier to pipe-jack the apparatus into the open hole 1016. An example of a hydraulic excavating bit 1011 is shown with nozzles 1012 oriented at different angles so that they will form a larger diameter open hole 1015. The end of the open hole 1016 is advanced by the water jets by well-known soft-ground water jet drilling mechanisms. The excavated material and the water form a slurry which is returned through the annulus formed by the casing 1014 and the conduit pipe 1013. The diameter of the open hole is in the range of about 0.2 meters to about 1½ meters. The outside diameter of the casing would have a diameter in the range of 20 to 100 millimeters less than the open hole 1015. This embodiment would be used if the inside wall of the open hole 1015 tends to collapse as a result of gas exolving from the bitumen in the oil sand when the oil sand is exposed to a lower pressure. The wall thickness of the casing 1014 is in the range of about 10 to 30 millimeters in thickness. The casing may or may not contain perforations and may have weak points that will allow the casing to snap or break off when it becomes unsupported over a substantial length. In the event that the casing becomes difficult to advance, the hydraulic jet can be shut down and the flow in the annulus formed by the casing 1014 and the conduit pipe 1013 can be reversed to allow a lubricating fluid, such as for example, bentonite to flow through perforations in the casing 1014 in order to reduce the resistance between the advancing casing 1014 and the open hole 1015. Also, in the event that formation material blocks the return flow of slurry, the hydraulic jet can be shut down and the flow in the annulus formed by the casing 1014 and the conduit pipe 1013 can be reversed to unblock the annulus.

FIG. 11 is a schematic illustrating a sequence of forming a settable aggregate core in an oil sands deposit. The settable aggregate can be formed, for example from a lean concrete mix. This figure represents the initial operations for implementing an innovative means of forming a producing or backfilling well in an oil sand formation which has gases dissolved in the bitumen component of the oil sands and is an alternative, preferred method of installing a casing as described in FIG. 10*b*. As shown in FIG. 11*a*, a well 1103 is drilled into the oil sand 1101 from the main access tunnel (not shown) by conventional means such as, for example, a rotary drill using circulated mud to lubricate the bit 1102 and support the hole 1103. Either forward circulation as shown or reverse circulation drilling techniques can be used. In forward or conventional circulation, drilling mud is pumped down a conduit 1104 in the drill rod 1105 and returns via the annulus 1106 formed by the drill rod 1105 and the well bore 1103. FIG. 11*b* shows the drill bit 1102 at the end of drilling into the oil sand deposit 1101. FIG. 11*c* shows the drill bit 1102 being withdrawn down drill hole 1108 and a settable aggregate being pumped into the hole 1108 via the drill rod conduit 1109. As shown by FIG. 11*d*, when the drill bit is fully withdrawn, the hole 1108 is filled with a settable aggregate core. The diameter of the open hole 1108 is in the range of about 0.2 meters to about 2 meters. The settable aggregate core lengths are limited by the drilling technology employed but are at least in the range of about 100 to 1,200 meters. The compressive strength of the settable aggregate core, once it has been injected and set, is in the range of about 500 to 2,000 psi.

FIG. 12 is a method of drilling a lower production well using the settable aggregate core of FIG. 11. FIG. 12*a* shows a smaller guided drill bit 1203 to form a liner hole 1204 inside the settable aggregate core embedded in oil sands 1201. The diameter of the hole 1204 is in the range of about 0.2 meters to about 1.7 meters so that the wall thickness of the remaining settable aggregate is of sufficient strength to hold open the hole 1204. Drill bit 1203 is guided by any number of well-known guidance techniques commonly practiced in today's well-drilling industries. FIG. 12*b* shows the drill bit 1203 just exiting the settable aggregate core and completing the cased well bore 1204 into oil sands 1201. FIG. 12*c* shows the drill bit 1203 being withdrawn leaving a cased well bore 1205 and a small open section 1206. FIG. 12*d* shows a hydraulic drilling assembly with drill string 1207 and hydraulic bit 1208 such as described in FIG. 10 in position to begin hydraulic mining in the oil sands 1201, initiating its hydraulic mining operations from the distal end of the settable aggregate liner 1204. As can be appreciated, the upper sand injection well can be formed in the same way although the upper well may be of a smaller diameter than the lower producing well. It is noted that, for hydraulic mining, the drill string 1207 and attached hydraulic bit 1208 need not be centered within lined hole 1204. In fact it may be preferable in some situations that the drill string 1207 and attached hydraulic bit 1208 lay along the bottom of settable aggregate liner 1204 during hydraulic mining to enhance the turbulence of the oil sand slurry flowing back to the access tunnel.

Once a volume of oil sands is mined and ready for backfilling, the hydraulic drill bit can be withdrawn into the settable aggregate liner and the hydraulic jet or jets can be used to rubblize the settable aggregate liner back to the next mining location. The next mining location for the hydraulic mining bit may be about 5 to about 80 meters back towards the well-head location. The length of the settable aggregate liner rubblized is dictated by the ground conditions necessary to avoid subsidence of the ground overlying the oil sands deposit before backfilling with tailings stabilizes the mined volume.

FIG. 13 is a schematic illustrating a sequence of forming a well initially as an open or unsupported well bore in an oil sands deposit. This figure represents the initial operations for implementing an innovative means of forming a producing well in an oil sand formation which has gases dissolved in the bitumen component of the oil sands and is an alternative to the method of installing a casing as described in FIG. 10 or the settable aggregate liner as described in FIG. 12. As shown in FIG. 13*a*, a well 1303 is drilled into the oil sand 1301 from the main access tunnel (not shown) by conventional means such as, for example, a rotary drill using circulated mud to lubricate the bit. FIG. 13*b* shows the drill bit 1302 at the end of drilling into the oil sand deposit 1301. FIGS. 13*a* and *b* are identical to FIGS. 11*a* and 11*b*. FIG. 13*c* shows the drill bit 1302 being withdrawn down drill hole 1303, leaving the hole open and unsupported. As shown by FIG. 13*d*, when the drill bit is fully withdrawn, the hole 1303 is open and unsupported. The diameter of the open hole 1303 is in the range of about 0.2 meters to about 2 meters. The ability of the hole to remain open is dependent on the formation pressure and dissolved gases in the oil sand. The hole can be pressurized by air or another gas to approximately formation pressure to allow the hole to remain open for an extended period.

FIG. 14 is a method of supporting a open or unsupported well using an inflatable liner. The method shown is based on the well-known cured-in-place-pipe (CIPP) process which has been in use for underground pipe rehabilitation such as, for example, those exposed to the corrosive environment that exists in sewer lines. In one version of the CIPP process, a felt tube is impregnated with a polyester thermosetting resin. As applied to the method of hydraulic mining described herein, the tube is inserted into a length of an open, unsupported well-bore. FIG. 14*a* shows a collapsed tube 1405 being pushed into an open well-bore 1403 in an oil sand deposit 1401 by the pressure applied by injecting hot water or steam 1409. The pressure of the hot water or steam 1409 turns the tube 1405 inside out, pressing it outward against the walls 1403 of the open, unsupported well-bore to form a liner 1404. When the tube reaches a termination point as shown in FIG. 14*b*, the collapsed portion 1405 is cut off by any of several well-known means, leaving an end section 1406 which supports the inside of the well-bore against the formation 1401. The water or steam 1409 inside the tube is hot and is designed to cause the resin to cure and harden shortly after the liner 1404 is inflated and installed. The result is a moderately strong, jointless liner 1404 for the open, unsupported well-bore 1403. Once in place as shown in FIG. 14*c*, a rotary, percussive or hydraulic drill bit or robotic cutter 1407 is used to cut through and remove the end of the liner 1406. As shown in FIG. 14*d*, a hydraulic drill 1407 can begin hydraulically mining the oil sand 1401.

The CIPP process has been used successfully over lengths of approximately 300 to 500 meters. In the present application, the lower production well can be formed in several stages where a stage length is comprised of the steps illustrated in FIGS. 13 and 14. That is, a length of open hole is formed and subsequently lined in stages using the CIPP process. The length of lined hole at each stage is determined by the length of open hole that will remain stable and not collapse before a liner can be installed. The diameter of the lined hole 1404 is in the range of about 0.5 meters to about 2 meters. The compressive strength of the polyester thermosetting resin is in the range of about 500 to 1,500 psi.

As can be appreciated, the upper sand injection well can be formed in the same way although the upper hole may be of a smaller diameter than the lower producing well. It is noted that, for hydraulic mining, the drill string 1407 and attached hydraulic bit 1408 need not be centered within liner 1404. As noted previously, it may be preferable in some situations that the drill string 1407 and attached hydraulic bit 1408 lay along the bottom of liner 1404 during hydraulic mining to enhance the turbulence of the oil sand slurry flowing back to the access tunnel.

Hydraulic Mine Operation

Figure 15:
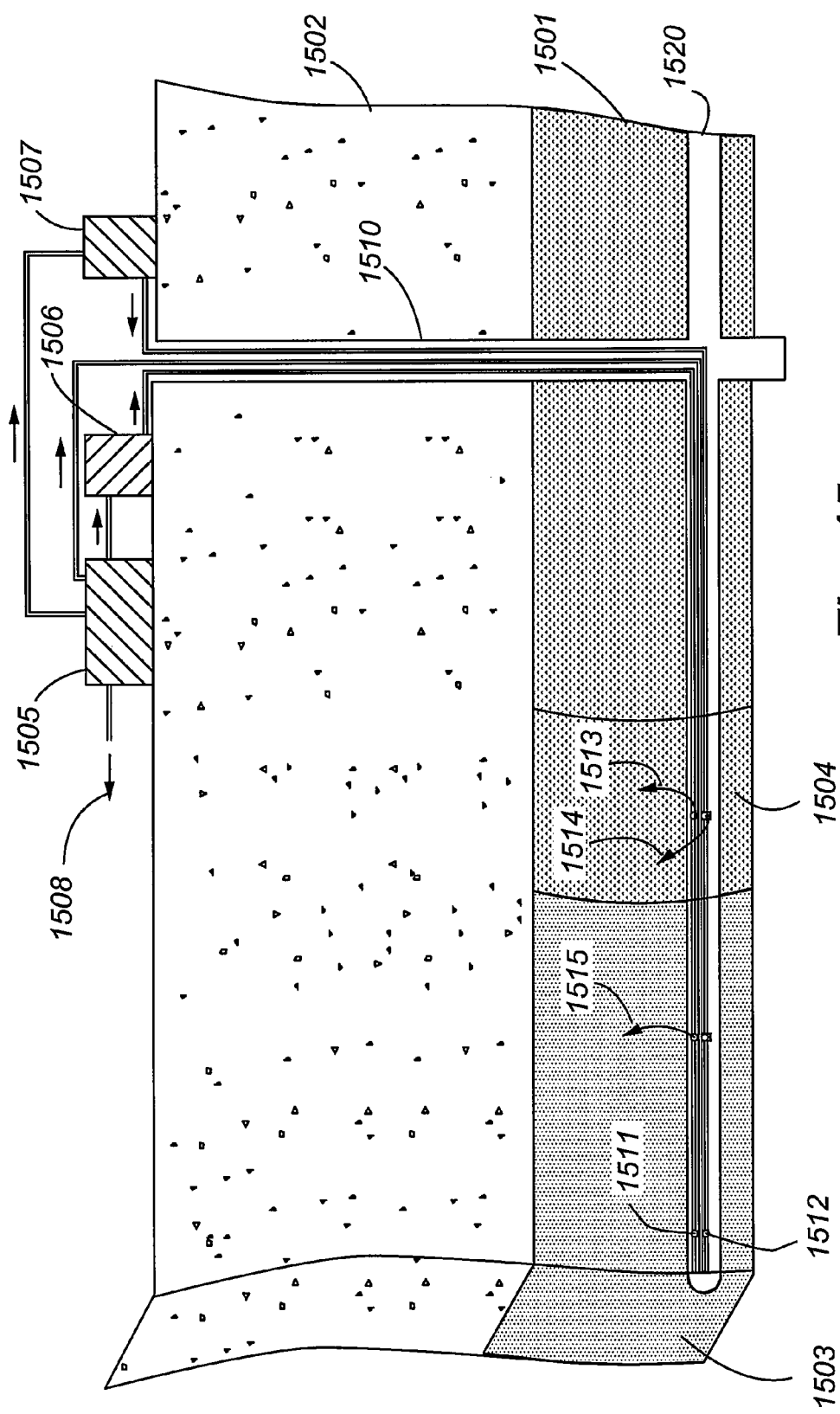
FIG. 15 is a schematic of a possible flow of materials in an underground hydraulic mine.

FIG. 15 is a cross-sectional schematic of a possible flow of various important materials in an underground oil sand mine utilizing hydraulic mining. In this configuration, the bitumen extraction facilities are located on the surface. The mine consists of a main access tunnel 1520 located in an oil sands deposit 1501 and connected to the surface by a main access shaft 1510. The main access shaft 1510 is installed through overburden 1502 and oil sand deposit 1501. Treated or untreated water is stored in reservoir 1507 and is delivered to the main access tunnel and injected under its gravity pressure head to hydraulically mine oil sand via lower wells 1512. The water is injected as shown by arrow 1514. This produces an oil sand slurry which is recovered also by lower well 1512. The oil sand slurry is recovered as shown by arrow 1513 and is pumped along the access tunnel 1520 and up the shaft 1510 to the surface and delivered to extraction facility 1505. The water, sand and bitumen in the oil sands slurry are separated in extraction facility 1505. The recovered bitumen is delivered to an upgrader (not shown) for further processing as indicated by arrow 1508. A first portion of the recovered water is sent from the extraction facility 1505 to water reservoir 1507 for use in further hydraulic mining. A second portion of the recovered water is sent from the extraction facility 1505 to a sand slurry facility 1506. The recovered sand is sent from the extraction facility 1505 to the sand slurry facility 1506. The sand slurry formed in the sand slurry facility 1506 is then delivered to the main access tunnel and injected under its gravity pressure head to upper wells 1511 to be injected as backfill 1503. The backfill sand slurry water is injected as shown by arrow 1515. A portion of the water in the backfill will drain towards the bottom of the reservoir and can be recovered by any of the lower producing wells. As can be seen, water is continuously circulated in a closed loop during mining and backfilling, except for water that remains in the pore space of the backfill or leaks into other parts of the formation. Sand is also continuously circulated in a closed loop except for a portion that, because of bulking, cannot be returned as backfill. This extra sand may be stored on the surface and used for a variety of other purposes. Typically this extra sand represent about 5% to about 15% of the total sand originally present in the oil sand deposit that has been mined. As can be appreciated, if the gravity head provides insufficient pressure for either hydraulic mining or backfilling, pumps can be used to generate the required pressures.

Production Rates

As of 1998, Syncrude had oil sand hydrotransport lines 0.68 meters in diameter that transported oil sand slurries about 4.5 km into the plant. Typical flows were about 1.7 $m^3$/sec at slurry densities of about 1,570 $kg/m^3$. This is a flow velocity of 4.68 m/s. Syncrude also had tailings lines 0.6 meters in diameter that moved a sand/water slurry with typical slurry flows of about 1 $m^3$/sec at a slurry density of 1,500 $kg/m^3$. This is a flow velocity of 3.5 m/s. These oil sands and tailings flow velocities are in the practical range with lower velocities resulting in solids tending to settle out and with higher velocities resulting in increased abrasion of the conduit pipe walls. Thus a flow velocity of 3.5 m/s is a reasonable estimate of a flow velocity for both oil sand slurries and tailings slurries.

As an example, consider an oil sand slurry with density of 1,570 $kg/m^3$. This is equivalent to 0.895 $m^3$ of water per 1 $m^3$ of oil sand material (assuming the density of 11% by mass ore-grade oil sand is 2,080 $kg/m^3$ and the density of water is 1,000 $kg/m^3$). Thus, for every cubic meter of oil sand excavated from a production well of the present invention, 1.895 cubic meters of oil sand slurry can be transported to the main access tunnel. Using a 1 meter inside diameter for the outer pipe casing and a 0.15 meter outside diameter for the water jet pipe and a flow velocity of 3.5 m/sec at slurry densities of about 1,570 $kg/m^3$, 2.67 $m^3$/sec of slurry would be produced. This slurry would which would contain 1.42 $m^3$/sec of oil sand. Using 11% by mass ore grade, 2,946 kg/s of oil sand or 324 kg/s of bitumen would be produced. This is 0.323 $m^3$/sec of bitumen production which is equivalent to 2 bbls bitumen per sec or 7,200 bbls bitumen per hour per producer well. This is far in excess of 500 to 1,000 bbls bitumen per day per well typical of a successful SAGD operation.

This implies that hydraulic mining as contemplated by the method of the present invention can be carried out (1) by using smaller diameter wells or (2) by excavating and producing for only a fraction of the available time. If production is intermittent, then the production rate of bitumen per producing wells can be maximized to be compatible with handling the amount of water, sand and bitumen from a large underground hydraulic mining operation.

A number of variations and modifications of the invention can be used. As will be appreciated, it would be possible to provide for some features of the invention without providing others. For example, it would be possible to apply this hydraulic mining concept to heavy oil in oil sand deposits. In this case, a diluent might be used to mobilize the heavy oil. The diluent can be injected into the mined volume prior to backfilling so that it can be absorbed by the heavy oil and cause the viscosity of the heavy oil to be lowered in order to facilitate production.

It is also possible to hydraulically mine and backfill a volume of reservoir using a single well if the reservoir is thin. While it is preferable to backfill from a well near the top of the reservoir, backfilling from a well near the bottom of the reservoir can be a practical alternative in a thin reservoir (for example, a reservoir no thicker than about 4 or 5 meters). In this case, the ore can be mined hydraulically for a period then the slurry flow can be reversed to inject a backfill slurry.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) through a well, hydraulically excavating an in situ underground hydrocarbon-containing material to form a slurried hydrocarbon-containing material, the hydrocarbon-containing material comprising a gas;
   (b) removing, through a well, the slurried hydrocarbon-containing material to form an excavated underground opening; and
   (c) introducing, through a well, a slurried fill material into at least a portion of the underground opening to form a backfilled zone, wherein the well comprises a well head apparatus to enable the excavated underground opening to be pressurized substantially to formation pressure to inhibit evolution of the gas in the hydrocarbon-containing material.

2. The method of claim 1, wherein steps (a) and (b) are performed using a common well, wherein the common well has a diameter ranging from about 0.2 to about 1.5 meters, wherein step (c) is performed using a different well positioned above the common well, and wherein the different well has a diameter ranging from about 0.15 to about 1 meter.

3. The method of claim 1, wherein steps (a), (b), and (c) are performed substantially simultaneously, whereby as a mined face advances a leading edge of the backfilled zone also advances.

4. The method of claim 1 wherein the well has a diameter ranging from about 0.2 to about 2 m and wherein steps (a)-(c) are performed through a common well.

5. The method of claim 1, wherein step (c) is performed after steps (a) and (b), wherein the slurried backfill material comprises at least a portion of the excavated material, and wherein a binder is added to the slurried backfill material.

6. The method of claim 1, wherein steps (a)-(c) are controlled from a well-head location, wherein, at a first time, steps (a) and (b) are controlled from a first well-head location, wherein steps (a) and (b) form an excavation having a zone of influence, wherein, at a second later time, step (c) is controlled from the first well-head location, wherein, at the second time, steps (a) and (b) are controlled from a second well-head location, and wherein the excavation controlled from the second well head location is outside the zone of influence of the excavation controlled from the first well-head location.

7. The method of claim 6, wherein steps (a)-(b) are controlled from a well-head location and step (c) from a second well-head location and wherein the first and second well-head locations are sufficiently far apart to inhibit removal of the backfill material as part of the slurried hydrocarbon-containing material.

8. The method of claim 1, wherein the well comprises a well-head located in a manned excavation.

9. The method of claim 1, wherein step (c) is performed through a second well and steps (a) and (b) through at least a first well, wherein steps (a) and (b) are performed during a first time interval, wherein step (c) is performed during a second later time interval, and, during the first time interval, further comprising:
   (d) through the second well, hydraulically excavating a second portion of the in situ underground hydrocarbon-containing material to form a second excavated opening, the second excavated opening being positioned above and in spatial proximity to the excavated opening formed by step (b); and
   (e) through the second well, introducing the slurried backfill material into the second excavated opening, thereby providing a pressure gradient that is highest near the second excavated opening, the pressure gradient causing unexcavated in situ hydrocarbon-containing material positioned between the excavated opening of step (b) and the second excavated opening to collapse into the excavated opening of step (b).

10. The method of claim 1, further comprising:
    (d) inserting an energetic material into the excavated opening;
    (e) initiating the energetic material to cause unexcavated hydrocarbon-containing material in proximity to the excavated opening to collapse into the opening.

11. The method of claim 1, further comprising:
    (d) drilling a first opening into the in situ hydrocarbon-containing material, the first opening having a first diameter;
    (e) introducing a slurried settable aggregate into the first opening;
    (f) permitting the settable aggregate to set into a substantially solid phase;
    (g) thereafter drilling a second opening through the solid phase aggregate, the second opening having a second diameter smaller than the first diameter, whereby the remaining solid phase aggregate acts as a liner between the first and second opening;
    (h) thereafter introducing a hydraulic drill string into the second opening, wherein at least one of steps (a) and (b) on the one hand and step (c) on the other hand is performed using the second opening; and
    (i) thereafter repositioning the drill string at a selected position within the second opening and hydraulically destroying the solid phase aggregate in proximity to the selected position.

12. The method of claim 1, further comprising:
    (d) drilling a first opening into the in situ hydrocarbon-containing material, the first opening having a first diameter;
    (e) introducing a settable member into the first opening;
    (f) introducing a fluid into the settable member to cause the member to contact with the wall of the first opening;
    (g) permitting the settable member to set into a substantially rigid liner;
    (h) thereafter introducing a hydraulic drill string into the first opening, wherein at least one of steps (a) and (b) on the one hand and step (c) on the other hand is performed using the first opening; and
    (i) thereafter repositioning the drill string at a selected position within the first opening and hydraulically destroying the solid liner in proximity to the selected position.

13. A method, comprising:
    (a) through a first set of wells, hydraulically excavating an in situ underground hydrocarbon-containing material to form a slurried hydrocarbon-containing material, the hydrocarbon-containing material comprising a gas;
    (b) removing, through the first set of wells, the slurried hydrocarbon-containing material to form an excavated underground opening; and
    (c) introducing, through a second set of wells, a slurried fill material into at least a portion of the underground opening to form a backfilled zone, wherein the first and second sets of wells each comprise a well head apparatus to enable the excavated underground opening to be pressurized substantially to formation pressure to inhibit evolution of the gas in the hydrocarbon-containing material.

14. The method of claim 13, wherein steps (a) and (b) are performed using a common well in the first set of wells, wherein each of the first set of wells has a diameter ranging from about 0.2 to about 1.5 meters, wherein the second set of wells are positioned above the common well, and wherein each of the second set of wells has a diameter ranging from about 0.15 to about 1 meter.

15. The method of claim 13 wherein each of the wells in the first set of wells has a diameter ranging from about 0.2 to about 2 m and wherein each of the wells in the second set of wells has a diameter ranging from about 0.15 to about 1 meter.

16. The method of claim 13, wherein steps (a), (b), and (c) are performed substantially simultaneously, whereby as a mined face advances a leading edge of the backfilled zone also advances.

17. The method of claim 13, wherein step (c) is performed after steps (a) and (b), wherein the slurried backfill material comprises at least a portion of the excavated material, and wherein a binder is added to the slurried backfill material.

18. The method of claim 13, wherein steps (a)-(c) are controlled from a well-head location, wherein, at a first time, steps (a) and (b) are controlled from a first well-head location wherein steps (a) and (b) form an excavation having a zone of influence, wherein, at a second later time, step (c) is controlled from the first well-head location, wherein, at the second time, steps (a) and (b) are controlled from a second well-head location, and wherein the excavation controlled from the second well head location is outside the zone of influence of the excavation controlled from the first well-head location.

19. The method of claim 13, wherein each of the first and second sets of wells comprise a corresponding well-head and wherein the well-heads are located in a manned excavation.

20. The method of claim 13, wherein steps (a)-(b) are controlled from a well-head location and step (c) from a second well-head location and wherein the first and second locations are sufficiently far apart to inhibit removal of the backfill material as part of the slurried hydrocarbon-containing material.

21. The method of claim 13, wherein the members of the first set of wells differ from the members of the second set of wells, wherein steps (a) and (b) are performed during a first time interval, wherein step (c) is performed during a second later time interval, and, during the first time interval, further comprising:
(d) through the second set of wells, hydraulically excavating a second portion of the in situ underground hydrocarbon-containing material to form a second excavated opening, the second excavated opening being positioned above and in spatial proximity to the excavated opening formed by step (b); and
(e) through the second set of wells, introducing the slurried backfill material into the second excavated opening, thereby providing a pressure gradient that is highest near the second excavated opening, the pressure gradient causing unexcavated in situ hydrocarbon-containing material positioned between the excavated opening of step (b) and the second excavated opening to collapse into the excavated opening of step (b).

22. The method of claim 13, further comprising:
(d) inserting an energetic material into the excavated opening;
(e) initiating the energetic material to cause unexcavated hydrocarbon-containing material in proximity to the excavated opening to collapse into the opening.

23. The method of claim 13, further comprising:
(d) drilling a first opening into the in situ hydrocarbon-containing material, the first opening having a first diameter;
(e) introducing a slurried settable aggregate into the first opening;
(f) permitting the settable aggregate to set into a substantially solid phase;
(g) thereafter drilling a second opening through the solid phase aggregate, the second opening having a second diameter smaller than the first diameter, whereby the remaining solid phase aggregate acts as a liner between the first and second opening;
(h) thereafter introducing a hydraulic drill string into the second opening, wherein at least one of steps (a) and (b) on the one hand and step (c) on the other hand is performed using the second opening; and
(i) thereafter repositioning the drill string at a selected position within the second opening and hydraulically destroying the solid phase aggregate in proximity to the selected position.

24. The method of claim 13, further comprising:
(d) drilling a first opening into the in situ hydrocarbon-containing material, the first opening having a first diameter;
(e) introducing a settable member into the first opening;
(f) introducing a fluid into the settable member to cause the member to contact with the wall of the first opening;
(g) permitting the settable member to set into a substantially rigid liner;
(h) thereafter introducing a hydraulic drill string into the first opening, wherein at least one of steps (a) and (b) on the one hand and step (c) on the other hand is performed using the first opening; and
(i) thereafter repositioning the drill string at a selected position within the first opening and hydraulically destroying the solid liner in proximity to the selected position.

25. An excavation, comprising:
a manned excavation extending from a surface location to a location in or near a hydrocarbon-containing formation;
a first set of wells extending from the manned excavation into the hydrocarbon-containing formation, each member of the first set of wells comprising a hydraulic drill string operable to excavate a selected portion of the hydrocarbon-containing formation, each of the hydraulic drill strings comprising a plurality of nozzles oriented at different angles relative to a selected axis to form a larger diameter opening of the member of the first set of wells, wherein each of the first set of wells can remove the selected portion of the hydrocarbon-containing formation, the selected portion being in the form of a slurry; and
a second set of wells extending from the manned excavation into the hydrocarbon-containing formation, each member of the second set of wells comprising a hydraulic drill string operable to introduce a slurried backfill material into openings excavated hydraulically by the first set of wells.

26. The excavation of claim 25, wherein the first set of wells are positioned below the second set of wells.

27. A method, comprising:
(a) forming an excavation extending into an underground in situ hydrocarbon-containing deposit, the excavation being an unsupported well bore and the hydrocarbon-containing deposit comprising an entrapped gas that escapes into the well bore, thereby causing the deposit to collapse into the well bore;
(b) inserting a tube into the unsupported well bore;
(c) inflating the tube, thereby causing the tube to press outwardly against the wall of the well bore to form a liner and a lined excavation;
(d) locating at least one of a hydraulic excavating and backfilling assembly in the lined excavation; and
(e) after a selected set of operations is completed by the at least one of a hydraulic excavating and backfilling assembly, removing at least part of the liner.

28. The method of claim 27, wherein the tube is impregnated with a polyester thermosetting resin and wherein step (c) comprises:
(C1) injecting at least one of hot water and steam into the tube to turn at least part of the tube inside out, wherein the at least one of hot water and steam causes the resin to cure and harden, thereby forming the liner.

29. The method of claim 28, further comprising:
(C2) cutting off a collapsed portion of the tube after step (C1).

30. The method of claim 28, wherein a diameter of the lined bore hole ranges from about 0.5 to about 2 meters and wherein a compressive strength of the polyester thermosetting resin ranges from about 500 to about 1,500 psi.

* * * * *